US009151636B2

(12) United States Patent
Sato

(10) Patent No.: US 9,151,636 B2
(45) Date of Patent: Oct. 6, 2015

(54) TRAVEL GUIDANCE SYSTEM, TRAVEL GUIDANCE APPARATUS, TRAVEL GUIDANCE METHOD AND COMPUTER PROGRAM

(75) Inventor: Yuji Sato, Owariasahi (JP)

(73) Assignee: AISIN AW CO., LTD., Anjo (JP)

( * ) Notice: Subject to any disclaimer, the term of this patent is extended or adjusted under 35 U.S.C. 154(b) by 125 days.

(21) Appl. No.: 13/821,505

(22) PCT Filed: Feb. 13, 2012

(86) PCT No.: PCT/JP2012/053900
§ 371 (c)(1),
(2), (4) Date: Mar. 7, 2013

(87) PCT Pub. No.: WO2012/132619
PCT Pub. Date: Oct. 4, 2012

(65) Prior Publication Data
US 2013/0166206 A1 Jun. 27, 2013

(30) Foreign Application Priority Data

Mar. 31, 2011 (JP) ................................. 2011-079155

(51) Int. Cl.
*G01C 21/00* (2006.01)
*G01C 21/36* (2006.01)

(52) U.S. Cl.
CPC ........ *G01C 21/3629* (2013.01); *G01C 21/3655* (2013.01)

(58) Field of Classification Search
None
See application file for complete search history.

(56) References Cited

U.S. PATENT DOCUMENTS

| 5,774,071 | A | * | 6/1998 | Konishi et al. ................. 340/988 |
| 5,893,045 | A | * | 4/1999 | Kusama et al. ................ 701/428 |
| 5,904,728 | A | * | 5/1999 | Tamai et al. ................... 701/428 |
| 5,938,718 | A | * | 8/1999 | Morimoto et al. ............. 701/431 |
| 6,151,552 | A | * | 11/2000 | Koizumi et al. ............... 701/428 |
| 6,163,750 | A | * | 12/2000 | Nojima ......................... 701/443 |
| 6,212,470 | B1 | * | 4/2001 | Seymour et al. ........... 340/995.2 |
| 6,226,590 | B1 | * | 5/2001 | Fukaya et al. ................. 701/428 |
| 6,269,303 | B1 | * | 7/2001 | Watanabe et al. ............. 701/410 |
| 6,278,943 | B1 | * | 8/2001 | Yamauchi ..................... 701/443 |

(Continued)

FOREIGN PATENT DOCUMENTS

| CN | 101451852 A | 6/2009 |
| EP | 0 782 118 A1 | 7/1997 |

(Continued)

OTHER PUBLICATIONS

May 31, 2012 International Search Report issued in International Application No. PCT/JP2012/053900.

*Primary Examiner* — Rami Khatib
*Assistant Examiner* — Navid Ziaeianmehdizadeh
(74) *Attorney, Agent, or Firm* — Oliff PLC

(57) ABSTRACT

A guidance prompt used for guidance for a guide branch point ahead of a movable object is selected from among a plurality of potential guidance prompts, based on whether a distance from a guidance starting point where guidance starts to a guidance ending point by which guidance is required to be finished is greater than a distance traveled by the movable object while guidance is being spoken. The selected guidance prompt is then set as the guidance prompt for the guide branch point, and guidance for the guide branch point by the set guidance prompt is performed when the movable object reaches the guidance starting point associated with the set guidance prompt.

10 Claims, 11 Drawing Sheets

(56) References Cited

U.S. PATENT DOCUMENTS

| | | | |
|---|---|---|---|
| 6,347,280 B1* | 2/2002 | Inoue et al. | 701/443 |
| 6,456,935 B1* | 9/2002 | Ng | 701/431 |
| 7,974,780 B2* | 7/2011 | Nakayama et al. | 701/437 |
| 8,275,542 B2* | 9/2012 | Adachi et al. | 701/400 |
| 8,306,743 B2* | 11/2012 | Komatsu et al. | 701/437 |
| 8,538,681 B2* | 9/2013 | Arie | 701/411 |
| 8,560,231 B2* | 10/2013 | Vu et al. | 701/437 |
| 2004/0186663 A1* | 9/2004 | Irie | 701/211 |
| 2005/0261831 A1* | 11/2005 | Irie | 701/211 |
| 2006/0095203 A1* | 5/2006 | Kim et al. | 701/211 |
| 2006/0235607 A1* | 10/2006 | Nakashima | 701/200 |
| 2007/0124072 A1* | 5/2007 | Nakayama et al. | 701/211 |
| 2007/0208508 A1* | 9/2007 | Lee | 701/213 |
| 2008/0306686 A1* | 12/2008 | Nakayama | 701/211 |
| 2009/0070036 A1* | 3/2009 | Nakamura et al. | 701/211 |
| 2010/0063731 A1* | 3/2010 | Milbert et al. | 701/211 |
| 2010/0268453 A1 | 10/2010 | Otani et al. | |

FOREIGN PATENT DOCUMENTS

| | | |
|---|---|---|
| EP | 1 655 578 A1 | 5/2006 |
| EP | 1 793 206 A2 | 6/2007 |
| EP | 1 912 043 A1 | 4/2008 |
| JP | A-10-111140 | 4/1998 |
| JP | A-2002-156242 | 5/2002 |

* cited by examiner

F I G . 3

POTENTIAL GUIDANCE PROMPT CONDITIONS TABLE

| POTENTIAL GUIDANCE PROMPT | REQUIRED OUTPUT TIME | GUIDANCE STARTING POINT | GUIDANCE ENDING POINT | CONTINUED GUIDANCE REQUIRED POINT |
|---|---|---|---|---|
| (1) TURN LEFT (RIGHT) AT THE SECOND LIGHT | 4 SECONDS | 5 METERS BEFORE THE EXIT SIDE TRAFFIC LIGHT OF THE SECOND BRANCH POINT | 50 METERS BEFORE THE ENTRANCE SIDE TRAFFIC LIGHT OF THE FIRST BRANCH POINT | |
| (2) TURN LEFT (RIGHT) AT THE NEXT LIGHT AFTER THIS LIGHT | 4 SECONDS | THE NEARER OF i) 100 METERS BEFORE THE ENTRANCE SIDE TRAFFIC LIGHT OF THE FIRST BRANCH POINT, AND ii) 5 METERS BEFORE THE EXIT SIDE TRAFFIC LIGHT OF THE SECOND BRANCH POINT, TO THE GUIDE BRANCH POINT | 5 METERS BEFORE THE EXIT SIDE TRAFFIC LIGHT OF THE FIRST BRANCH POINT | |
| (3) TURN LEFT (RIGHT) AT THE NEXT LIGHT AFTER THE LIGHT BEING DRIVEN THROUGH | 6 SECONDS | THE NEARER OF i) 50 METERS BEFORE THE ENTRANCE SIDE TRAFFIC LIGHT OF THE FIRST BRANCH POINT, AND ii) 5 METERS BEFORE THE EXIT SIDE TRAFFIC LIGHT OF THE SECOND BRANCH POINT, TO THE GUIDE BRANCH POINT | 5 METERS BEFORE THE ENTRANCE SIDE TRAFFIC LIGHT OF THE GUIDE BRANCH POINT | 5 METERS BEFORE THE EXIT SIDE TRAFFIC LIGHT OF THE FIRST BRANCH POINT |
| ... | ... | ... | ... | ... |

TRAVEL GUIDANCE SYSTEM, TRAVEL GUIDANCE APPARATUS, TRAVEL GUIDANCE METHOD AND COMPUTER PROGRAM

TECHNICAL FIELD

The invention relates to a travel guidance system, a travel guidance apparatus, a travel guidance method, and a computer program, that guide a movable object based on a guide route.

BACKGROUND ART

In recent years, navigation systems that enable a driver to easily reach a desired destination by providing vehicle travel guidance are often provided in vehicles. The term navigation system here refers to a system configured to detect the current position of a host vehicle using a GPS receiver or the like, obtain map data corresponding to the current position through a network or a storage medium such as a DVD-ROM or a HDD or the like, and display that map data on a liquid-crystal display (LCD). In addition, this navigation system includes a route searching function that searches the optimum route from a point of departure to a destination when a desired destination is input. The navigation system then reliably guides a user to the desired destination by displaying a guide route set based on the search results by the route searching function on a display screen, and performing guidance using voice or the display screen when the host vehicle approaches a branch point for which guidance, such as for a left or right turn, is to be performed (hereinafter simply referred to as a "guide branch point"). Also in recent years, some mobile phones, Personal Digital Assistants (PDA), and personal computers and the like also have a function similar to that of the navigation system described above. Moreover, this kind of guidance can also be performed for pedestrians and bicyclists, as well as vehicles.

Here, when guidance for a left or right turn or the like is performed at a guide branch point, the guide branch point must be accurately identified by the user. Therefore, the timing at which guidance starts and the timing at which guidance ends according to a guidance prompt must each be set appropriately. For example, when providing the guidance "turn left at the second light" using a traffic light, guidance preferably starts after the traffic light that is two traffic-light branch points before the guide branch point disappears from the view of the user, and guidance preferably ends while the traffic light that is one traffic-light branch point before the guide branch point is still viewable by the user. Therefore, Japanese Patent Application Publication No. 2002-156242 (JP-A-2002-156242), for example, describes technology that, when performing guide branch point guidance with voice guidance in which the number of traffic lights is used, performs voice guidance using the number of traffic lights when the output of voice guidance ends before passing through the traffic light that is one traffic-light branch point before the guide branch point, and does not perform voice guidance when the output of voice guidance will not end before passing through the traffic light that is one traffic-light branch point before the guide branch point.

SUMMARY OF THE INVENTION

With the technology described in JP-A-2002-156242, voice guidance is not performed much at all in urban central areas and the like where the distances between traffic lights and branch points are short. However, it is more important to accurately identify guide branch points in urban central areas and the like, where the distances between traffic lights and branch points are short and where it is easy to miss a guide branch point, than it is in the suburbs where the distances between traffic lights and branch points are long. Therefore, with the technology described in JP-A-2002-156242, it is difficult to accurately identify a guide branch point to the user, so there is a possibility that the user may turn left or right too late, or that the vehicle may travel off the guide route.

The invention thus provides a travel guidance system, a travel guidance apparatus, a travel guidance method, and computer program, capable of more accurately identifying a guide branch point to a user, even in urban central areas and the like where the distances between traffic lights and branch points are short.

A first aspect of the invention relates to a travel guidance system including: a guide route setting unit that sets a guide route along which a movable object is guided, and a guide branch point on the guide route; a branch point obtaining unit that obtains both a position of a first branch point that is closer to a point of departure of the guide route than the guide branch point, and a position of a second branch point that is closer to the point of departure than the first branch point; a guidance setting unit that sets a guidance prompt for the guide branch point to a predetermined guidance prompt selected from among a plurality of potential guidance prompts; and a branch point guidance unit that performs guidance for the guide branch point using the predetermined guidance prompt selected by the guidance setting unit. In the travel guidance system, the guidance setting unit sets, for each of the plurality of potential guidance prompts, a guidance starting point that is a point where guidance starts to be spoken and a guidance ending point that is a point by which guidance is required to be finished being spoken; the guidance starting point is defined by a position between the first branch point and the second branch point, based on one of the first branch point and the second branch point; the guidance ending point is defined by a position based on one of the first branch point and the guide branch point; the guidance setting unit determines, for each of the plurality of potential guidance prompts, whether a guidance distance that is a distance from the guidance starting point to the guidance ending point is greater than a speaking travel distance that is a distance traveled by the movable object while guidance is being spoken when performing guidance with the potential guidance prompt; and the guidance setting unit selects the predetermined guidance prompt from among the plurality of potential guidance prompts, based on the determination result of whether the guidance distance of each potential guidance prompt is greater than the speaking travel distance. The movable object may include a pedestrian and a bicycle, in addition to a vehicle. Also, the guide branch point may be a branch point that is the object for which guidance, such as a left or right turn direction, is performed, when performing travel guidance for the movable object according to the guide route. Also, the position of the first branch point may be the position of the first branch point itself, or the position of an object (such as a traffic light or a stop line) near the first branch point. Also, the position of the second branch point may be the position of the second branch point itself, or the position of an object (such as a traffic light or a stop line) near the second branch point.

According to the travel guidance system having the structure described above, it is possible to set a suitable guidance prompt for performing guidance for the guide branch point, taking into account the timing at which the guidance is to start being spoken and the timing at which the guidance is required to finish being spoken which are based on the position of the branch point, from among the plurality of potential guidance prompts, and perform the guidance for the guide branch point. Therefore, even if one potential guidance prompt is unsuitable to perform guidance for the guide branch point, guidance is able to be performed using another potential guidance prompt that is suitable, thus inhibiting guidance for the guide branch point from not being performed, as is the case with the related art. Also, even in urban central areas and the like where the distances between traffic lights and branch points are short, for example, it is possible to more accurately identify a guide branch point to the user. Also, it is possible to more accurately identify a guide branch point to the user than it is when guiding the movable object using the distance to the guide branch point.

The guidance setting unit may select, as the predetermined guidance prompt, the potential guidance prompt for which it is determined that the guidance distance is greater than the speaking travel distance.

According to the travel guidance system having the structure described above, when guidance starts to be spoken at the guidance starting point, a potential guidance prompt for which guidance will finish being spoken by the time the movable object reaches the guidance ending point is set as the guidance prompt of the guide branch point, so it is possible to perform guidance in which there is no inconsistency between the guidance prompt and what the user actually sees. Therefore, it is possible to more accurately identify a guide branch point to the user.

The guidance setting unit may preferentially select, as the predetermined guidance prompt, the potential guidance prompt in which the guidance starting point is closer to the point of departure, when there are a plurality of potential guidance prompts for which it is determined that the guidance distance is greater than the speaking travel distance.

According to the travel guidance system having the structure described above, there are a plurality of potential guidance prompts for which guidance will finish being spoken by the time the movable object reaches the guidance ending point when guidance starts to be spoken at the guidance starting point, a potential guidance prompt in which guidance will be started at an early timing is preferentially set as the guidance prompt of the guide branch point. As a result, guidance for the guide branch point can be performed for the user as early as possible. Therefore, the user is able to drive appropriately.

In the plurality of potential guidance prompts, the first branch point may be used for performing the guidance for the guide branch point and phrases referring to the first branch point may differ from one another. Guidance prompts using the first branch point may be guidance prompts using the first branch point itself, or guidance prompts using an object (such as a traffic light or a stop line) near the first branch point. Also, the phrase referring to the first branch point may be a phrase referring to the branch point itself, or a phrase referring to an object (such as a traffic light or a stop line) near the first branch point.

According to the travel guidance system having the structure described above, even with guidance prompts that use the same first branch point, various guidance corresponding to the road shape and the state of the movable object can be realized by changing the phrase referring to the first branch point.

The guidance setting unit may set, as the guidance starting point, a point located a predetermined distance away from the one of first branch point and the second branch point, for each of the plurality of potential guidance prompts. A point a predetermined distance away from the one of the first branch point and the second branch point may be a point a predetermined distance away from the one of the first branch point and the second branch point itself, or a point a predetermined distance away from an object (such as a traffic light or a stop line) near the one of the first branch point and the second branch point.

According to the travel guidance system having the structure described above, a point a predetermined distance away from the one of the first branch point and the second branch point is set as the guidance starting point for each of the plurality of potential guidance prompts, so it is possible to have the guidance start being spoken at an appropriate timing determined based on the relative position with the one of the first branch point and the second branch point.

The guidance setting unit may set the guidance ending point that is closer to the guide branch point than the first branch point, for at least one of the potential guidance prompts, from among the plurality of potential guidance prompts, and set the guidance ending point that is closer to the point of departure than the first branch point, for another potential guidance prompt other than the at least one potential guidance prompt, from among the plurality of potential guidance prompts. The determination of whether the guidance ending point is closer to the guide branch point than the first branch point and the determination of whether the guidance ending point is closer to the point of departure than the first guide branch point may be made based on the first branch point itself, or based on an object (such as a traffic light or a stop line) near the first branch point.

According to the travel guidance system having the structure described above, with at least one of the potential guidance prompts, from among the plurality of potential guidance prompts, the guidance ending point is set closer to the guide branch point than the first branch point, and with the other potential guidance prompts, the guidance ending point is set closer to the point of departure than the first branch point. As a result, the guidance is able to finish being spoken at an appropriate timing determined based on the relative position with one of the first branch point and the guide branch point.

The guidance setting unit may further set a continued guidance required point between the guidance starting point and the guidance ending point, for a specific potential guidance prompt, from among the plurality of potential guidance prompts, and may determine whether the guidance distance is greater than the speaking travel distance, and a distance from the guidance starting point to the continued guidance required point is less than the speaking travel distance, and may select the specified potential guidance prompt as the predetermined guidance prompt when it is determined that the guidance distance is greater than the speaking travel distance, and the distance from the guidance starting point to the continued guidance required point is less than the speaking travel distance.

According to the travel guidance system having the structure described above, a continued guidance required point is further set between the guidance starting point and the guidance ending point, for a specific potential guidance prompt, from among the plurality of potential guidance prompts, and it is determined whether the guidance distance is greater than the speaking travel distance, and a distance from the guidance starting point to the continued guidance required point is less than the speaking travel distance. Then, the specified potential guidance prompt is selected as the predetermined guidance prompt when it is determined that the guidance distance is greater than the speaking travel distance, and the distance from the guidance starting point to the continued guidance required point is less than the speaking travel distance. As a result, it is also possible to set a suitable guidance prompt for performing guidance for the guide branch point also taking into account the passing point of the movable object while guidance is being spoken, and perform the guidance for the guide branch point. Therefore, it is possible to perform guidance in which there is no inconsistency between the guidance prompt and what the user actually sees.

The travel guidance system may also include a traffic light information obtaining unit that obtains position information of a traffic light near the guide route. In this case, the position of the first branch point may be defined by the traffic light near the first branch point, the position of the second branch point may be defined by the traffic light near the second branch point, and the position of the guide branch point may be defined by the traffic light near the guide branch point.

According to the travel guidance system having the structure described above, it is possible to more accurately identify each position of the guidance starting point, the guidance ending point, and the continued guidance required point. In addition, it is possible to set a suitable guidance prompt to perform guidance for the guide branch point from among the plurality of potential guidance prompts, based on the positional relationship of the traffic light near the guide route.

The plurality of potential guidance prompts may identify at least one of the first branch point, the second branch point, and the guide branch point, using the traffic light.

According to the travel guidance system having the structure described above, guidance for the guide branch point can be performed by a clear guidance prompt using the traffic light. Also, it is possible to inhibit a traffic light indicated by a guidance prompt from being mistaken for another traffic light by the user, so the guide branch point is able to be more accurately identified to the user.

A second aspect of the invention relates to a travel guidance apparatus including: a guide route setting unit that sets a guide route along which a movable object is guided, and a guide branch point on the guide route; a branch point obtaining unit that obtains both a position of a first branch point that is closer to a point of departure of the guide route than the guide branch point, and a position of a second branch point that is closer to the point of departure than the first branch point; a guidance setting unit that sets a guidance prompt for the guide branch point to a predetermined guidance prompt selected from among a plurality of potential guidance prompts; and a branch point guidance unit that performs guidance for the guide branch point using the predetermined guidance prompt selected by the guidance setting unit. In the travel guidance apparatus, the guidance setting unit sets, for each of the plurality of potential guidance prompts, a guidance starting point that is a point where guidance starts to be spoken and a guidance ending point that is a point by which guidance is required to be finished being spoken; the guidance starting point is defined by a position between the first branch point and the second branch point, based on one of the first branch point and the second branch point; the guidance ending point is defined by a position based on one of the first branch point and the guide branch point; the guidance setting unit determines, for each of the plurality of potential guidance prompts, whether a guidance distance that is a distance from the guidance starting point to the guidance ending point is greater than a speaking travel distance that is a distance traveled by the movable object while guidance is being spoken when performing guidance with the potential guidance prompt; and the guidance setting unit selects the predetermined guidance prompt from among the plurality of potential guidance prompts, based on the determination result of whether the guidance distance of each potential guidance prompt is greater than the speaking travel distance.

According to the travel guidance apparatus having the structure described above, it is possible to set a suitable guidance prompt for performing guidance for the guide branch point, taking into account the timing at which the guidance is to start being spoken and the timing at which the guidance is required to finish being spoken which are based on the position of the branch point, from among the plurality of potential guidance prompts, and perform the guidance for the guide branch point. Therefore, even if one potential guidance prompt is unsuitable to perform guidance for the guide branch point, guidance is able to be performed using another potential guidance prompt that is suitable, thus inhibiting guidance for the guide branch point from not being performed, as is the case with the related art. Also, even in urban central areas and the like where the distances between traffic lights and branch points are short, for example, it is possible to more accurately identify a guide branch point to the user. Also, it is possible to more accurately identify a guide branch point to the user than it is when guiding the movable object using the distance to the guide branch point.

A third aspect of the invention relates to a travel guidance method including: setting a guide route along which a movable object is guided, and a guide branch point on the guide route; obtaining both a position of a first branch point that is closer to a point of departure of the guide route than the guide branch point, and a position of a second branch point that is closer to the point of departure than the first branch point; setting a guidance starting point that is a point where guidance starts to be spoken and a guidance ending point that is a point by which guidance is required to be finished being spoken, for each of the plurality of potential guidance prompts; determining whether a guidance distance that is a distance from the guidance starting point to the guidance ending point is greater than a speaking travel distance that is a distance traveled by the movable object while guidance is being spoken when performing guidance with the potential guidance prompt, for each of the plurality of potential guidance prompts; setting a guidance prompt for the guide branch point to a predetermined guidance prompt selected from among a plurality of potential guidance prompts, based on the determination result of whether the guidance distance of each potential guidance prompt is greater than the speaking travel distance; and performing guidance for the guide branch point using the predetermined guidance prompt. In the travel guidance method, the guidance starting point is defined by a position between the first branch point and the second branch point, based on one of the first branch point and the second branch point, and the guidance ending point is defined by a position based on one of the first branch point and the guide branch point.

According to the travel guidance method having the structure described above, it is possible to set a suitable guidance prompt for performing guidance for the guide branch point, taking into account the timing at which the guidance is to start being spoken and the timing at which the guidance is required to finish being spoken which are based on the position of the branch point, from among the plurality of potential guidance prompts, and perform the guidance for the guide branch point. Therefore, even if one potential guidance prompt is unsuitable to perform guidance for the guide branch point, guidance is able to be performed using another potential guidance prompt that is suitable, thus inhibiting guidance for the guide branch point from not being performed, as is the case with the related art. Also, even in urban central areas and the like where the distances between traffic lights and branch points are short, for example, it is possible to more accurately identify a guide branch point to the user. Also, it is possible to more accurately identify a guide branch point to the user than it is when guiding the movable object using the distance to the guide branch point.

A forth aspect of the invention relates to a computer program that is installed on a computer and that causes a processor to perform a travel guidance function. The travel guidance function including: setting a guide route along which a movable object is guided, and a guide branch point on the guide route; obtaining both a position of a first branch point that is closer to a point of departure of the guide route than the guide branch point, and a position of a second branch point that is closer to the point of departure than the first branch point; setting a guidance starting point that is a point where guidance starts to be spoken and a guidance ending point that is a point by which guidance is required to be finished being spoken, for each of the plurality of potential guidance prompts; determining whether a guidance distance that is a distance from the guidance starting point to the guidance ending point is greater than a speaking travel distance that is a distance traveled by the movable object while guidance is being spoken when performing guidance with the potential guidance prompt, for each of the plurality of potential guidance prompts; setting a guidance prompt for the guide branch point to a predetermined guidance prompt selected from among a plurality of potential guidance prompts, based on the determination result of whether the guidance distance of each potential guidance prompt is greater than the speaking travel distance; and performing guidance for the guide branch point using the predetermined guidance prompt. In the travel guidance function, the guidance starting point is defined by a position between the first branch point and the second branch point, based on one of the first branch point and the second branch point, and the guidance ending point is defined by a position based on one of the first branch point and the guide branch point.

According to the computer program having the structure described above, it is possible to set a suitable guidance prompt for performing guidance for the guide branch point, taking into account the timing at which the guidance is to start being spoken and the timing at which the guidance is required to finish being spoken which are based on the position of the branch point, from among the plurality of potential guidance prompts, and perform the guidance for the guide branch point. Therefore, even if one potential guidance prompt is unsuitable to perform guidance for the guide branch point, guidance is able to be performed using another potential guidance prompt that is suitable, thus inhibiting guidance for the guide branch point from not being performed, as is the case with the related art. Also, even in urban central areas and the like where the distances between traffic lights and branch points are short, for example, it is possible to more accurately identify a guide branch point to the user. Also, it is possible to more accurately identify a guide branch point to the user than it is when guiding the movable object using the distance to the guide branch point.

BRIEF DESCRIPTION OF THE DRAWINGS

The features, advantages, and technical and industrial significance of this invention will be described below with reference to the accompanying drawings, in which like numerals denote like elements, and wherein:

FIG. 3 is a view of an example of a potential guidance prompt conditions table;

DESCRIPTION OF EMBODIMENTS

Figure 1:
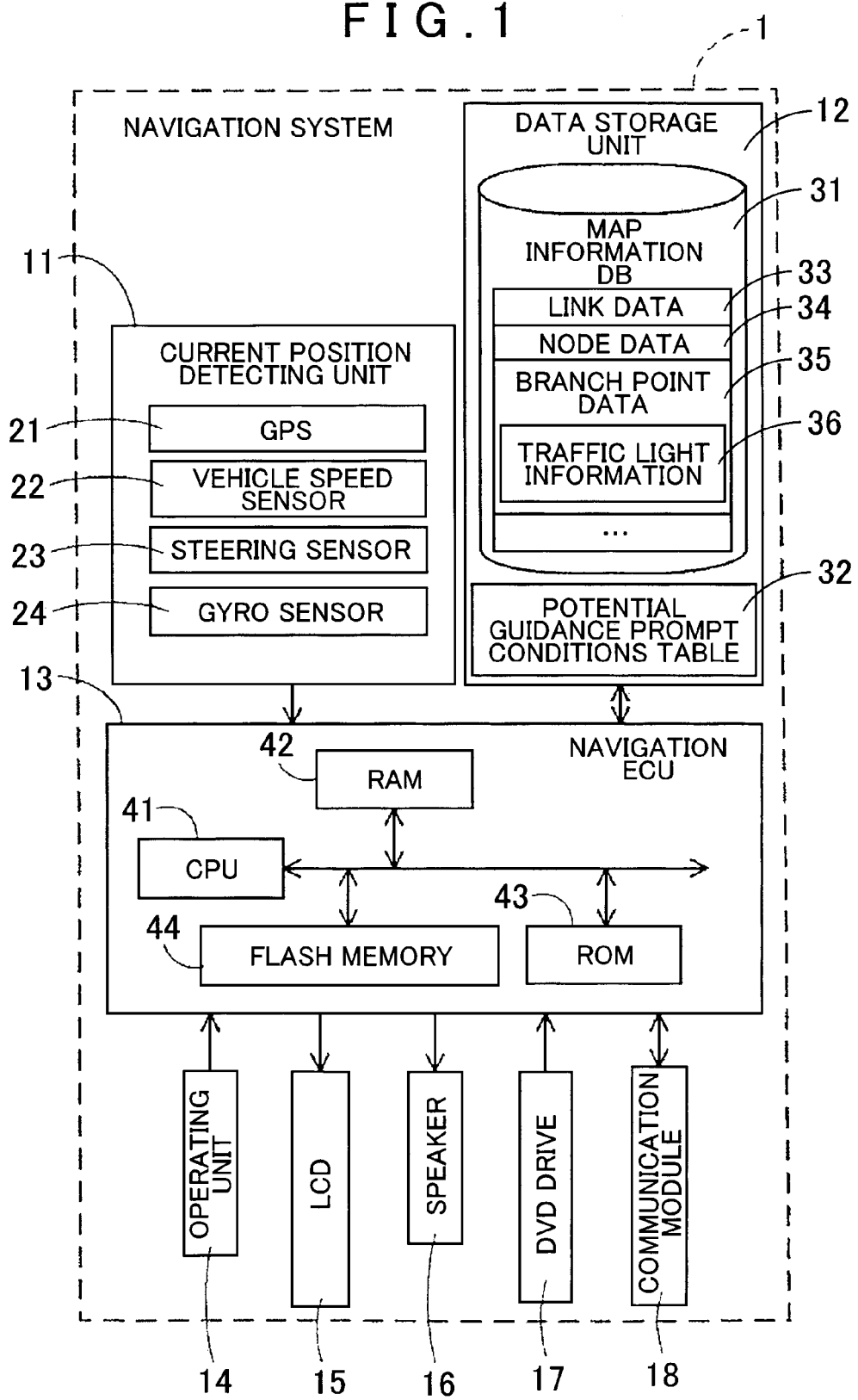
FIG. 1 is a block diagram of a navigation system according to an example embodiment of the invention.

Hereinafter, an embodiment in which the travel guidance system and travel guidance apparatus are applied to a navigation system will be described in detail with reference to the accompanying drawings. First, the general structure of a navigation system 1 in this example embodiment will be described with reference to FIG. 1. FIG. 1 is a block diagram of the navigation system according to this example embodiment.

As shown in FIG. 1, the navigation system 1 according to this example embodiment includes a current position detecting portion 11 that detects a current position of a vehicle provided with the navigation system 1, a data storage portion 12 in which various data is stored, a navigation electronic control unit ECU 13 (hereinafter simply referred to as "navigation ECU 13") that performs various calculations and processing, based on input information, an operating portion 14 that receives an operation from a user, a liquid-crystal display 15 (hereinafter simply referred to as "LCD 15") that displays facility information related to facilities as well as a map of the area around the vehicle to the user, a speaker 16 that outputs voice guidance related to route guidance, a DVD drive 17 that reads a DVD that is a storage medium, and a communication module 18 that performs communication with a probe center or an information center such as a Vehicle Information and Communication System (VICS) (Registered trademark in Japan) center or the like.

Hereinafter, the various constituent elements that make up the navigation system 1 will be described in order. The current position detecting portion 11 includes a GPS 21, a vehicle speed sensor 22, a steering sensor 23, and a gyro sensor 24 and the like, and is configured to detect the current position and orientation of the vehicle, the running speed of the vehicle, and the current time and the like. The vehicle speed sensor 22 is a sensor that detects the distance traveled and the speed of the vehicle. This vehicle speed sensor 22 generates a pulse in response to rotation of the driving wheels of the vehicle, and outputs a pulse signal to the navigation ECU 13. The navigation ECU 13 then calculates the distance traveled and the rotation speed of the driving wheels by counting the number of pulses generated. The navigation system 1 does not have to be provided with all of the five types of sensors described above. The navigation system 1 may alternatively be provided with only one or a plurality of these types of sensors.

The data storage portion 12 includes a hard disc, not shown, as an external storage device and storage medium, and a recording head, also not shown, for both reading map information DB 31, a potential guidance prompt conditions table 32, and predetermined programs and the like stored on the hard disc, and writing predetermined data to the hard disc. The data storage portion 12 may also be formed by an optical disc such as a memory card, a CD, or a DVD, instead of a hard disc.

The map information DB 31 is a storage unit in which is stored, for example, link data 33 related to roads (i.e., links), node data 34 related to node points, branch point data 35 related to branch points, location data related to the locations of facilities and the like, search data for searching for a route, and search data for searching for a location, and the like.

Link ID identifying the link, end node information identifying a node positioned at the end of the link, the type of road (i.e., the road type) that forms the link, and the number of lanes and the like, for example, are stored as the link data 33. Also, node ID identifying the node, position coordinates of the node, and connecting node information identifying a connecting node to which the node is connected via a link, and the like are stored as the node data 34. The relevant node information identifying a node that forms the branch point (i.e., intersection), connecting link information identifying a link that connects with the branch point (hereinafter referred to as a "connecting link"), and traffic light information 36 related to a traffic light near the branch point, and the like are stored as the branch point data 35.

Figure 2:
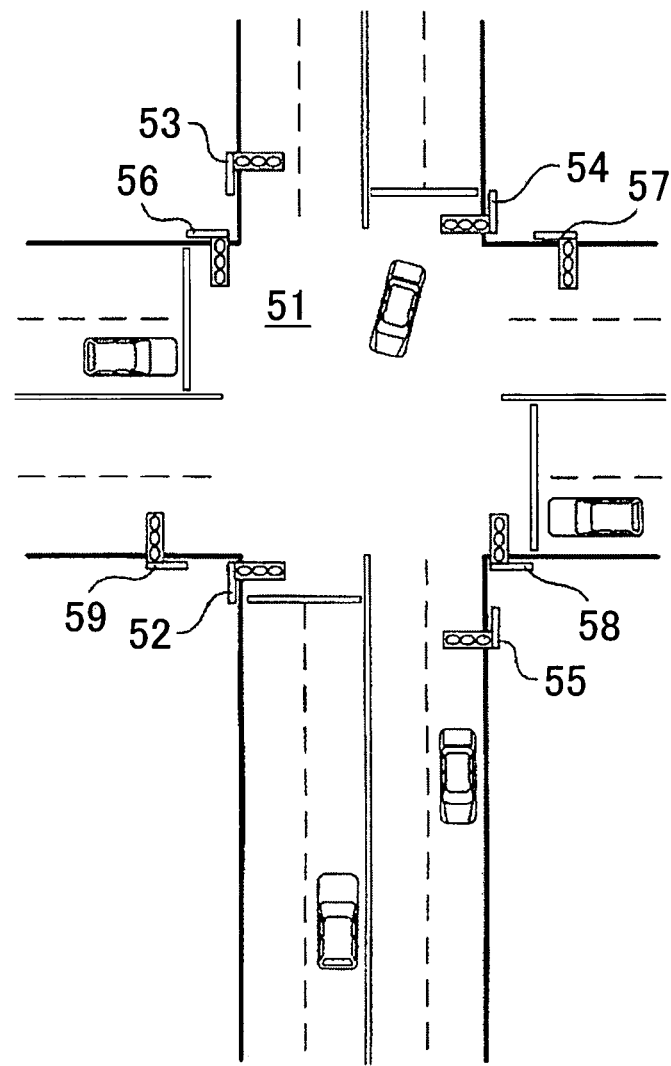
FIG. 2 is a view of an example of a traffic light at a branch point.

For a traffic light near each branch point (intersection) in the country, the orientation of the traffic light (i.e., the direction in which the light of the traffic light is facing, hereinafter referred to as the "orientation"), and the position coordinates of the traffic light (hereinafter referred to as the "coordinates") are stored as the traffic light information 36. If there is a plurality of traffic lights at a single branch point, the orientation and coordinates are stored for each of the plurality of traffic lights. For example, at branch point 51 where two roads each having two lanes in each direction intersect, as shown in FIG. 2, there are eight traffic lights 52 to 59. Therefore, the orientations and coordinates of the traffic lights 52 to 59 are stored as the traffic light information 36 of the branch point 51.

Only information related to the traffic light farthest away on the side where a vehicle exits the branch point (that is, the last traffic light visible from the vehicle, hereinafter referred to as the "exit side traffic light") may be stored for each exiting direction of the branch point, as the traffic light information 36. For example, with the branch point 51 shown in FIG. 2, information related to a traffic light 53 that is the exit side traffic light with respect to a direction in which a vehicle exits the branch point when traveling in the direction from the bottom of the drawing to the top of the drawing is stored, information related to a traffic light 55 that is the exit side traffic light with respect to a direction in which a vehicle exits the intersection when traveling in the direction from the top of the drawing to the bottom of the drawing is stored, information related to a traffic light 57 that is the exit side traffic light with respect to a direction in which a vehicle exits the intersection when traveling in the direction from the left to right in the drawing is stored, and information related to the traffic light 59 that is the exit side traffic light with respect to a direction in which a vehicle exits the intersection when traveling in the direction from the right to left in the drawing is stored. That is, of these eight traffic lights 52 to 59, only the orientation and coordinates of the traffic lights 53, 55, 57, and 59 may be stored. Also, only information related to a traffic light that is closest to the side where a vehicle enters a branch point (i.e., the departure side) (that is, the first traffic light visible from the vehicle, hereinafter referred to as the "entrance side traffic light") may be stored for each entering direction of a branch point, as the traffic light information 36. Furthermore, information related to a stop line instead of the traffic light may be stored. Also, the navigation ECU 13 identifies a guide branch point that is ahead of the vehicle, and obtains the traffic light information 36 for a traffic light near this guide branch point, based on various data stored in the map information DB 31, as will be described later. Then the navigation ECU 13 sets, from within a plurality of potential guidance prompts, a guidance prompt for the guide branch point that is ahead of the vehicle, based on the obtained traffic light information 36. The guide branch point is a branch point for which guidance such as a left or right turn prompt is to be performed, when the navigation system 1 performs travel guidance according to a guide route set in the navigation system 1.

The potential guidance prompt conditions table 32 is a table in which the content of phrases to be spoken, the time required to speak the guidance, a guidance starting point, i.e., a point where guidance starts to be spoken, a guidance ending point, i.e., a point by which voice guidance is required to be finished being spoken (that is, a point where guidance is required to be finished by the time the vehicle reaches this point), and a continued guidance required point, i.e., a point where voice guidance needs to be continued, and the like, are each stored associated with a plurality of types of potential guidance prompts that are potential guidance prompts for performing guidance for the guide branch point. In the navigation system 1 according to this example embodiment, the guidance starting point, the guidance ending point, and the continued guidance required point are identified by the relative position of the vehicle with respect to a traffic light near a guide branch point, as will be described later.

Figure 4:
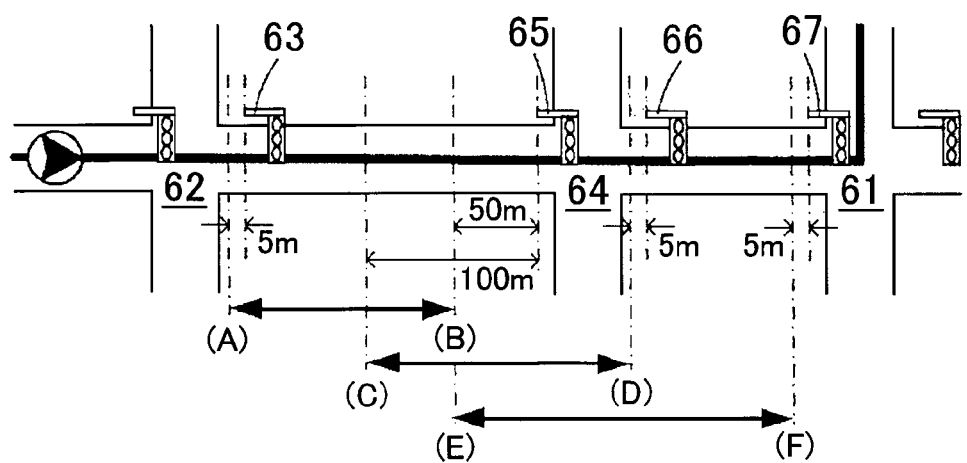
FIG. 4 is a view of guidance starting points, guidance ending points, and continued guidance required points set forth in the potential guidance prompt conditions table.

Next, the potential guidance prompt conditions table 32 will be described in more detail with specific examples of potential guidance prompts (1) to (3) below. FIG. 3 is a view of an example of the potential guidance prompt conditions table 32. FIG. 4 is a view of the guidance starting points, guidance ending points, and continued guidance required points set forth in the potential guidance prompt conditions table 32 shown in FIG. 3. The potential guidance prompts shown in FIG. 3 indicate potential guidance prompts to be output when performing guidance for a left or right turn at a guide branch point using a traffic light in particular, in guidance to be performed at a guide branch point. Also, in the description of the example embodiment below, a guide branch point is a branch point with a traffic light (i.e., hereinafter referred to as a "traffic light branch point"). The traffic light branch point that is one traffic light branch point before (i.e., on the departure side along a guide route) a guide branch point will be referred to as a first branch point, and the traffic light branch point that is one traffic light branch point before (i.e. on the departure side along a guide route) the first branch point will be referred to as a second branch point.

Potential Guidance Prompt (1)

For example, when performing the guidance "turn left (right) at the second light", the guidance is required to start and finish being spoken (i.e., that the output of the voice guidance be started and ended) while the user is still able to count two traffic lights before entering the guide branch point. Therefore, as shown in FIG. 3, as the guidance starting point, a point "5 meters before the exit side traffic light of the second branch point" (i.e., a point where the traffic light that is two traffic lights before the entrance side traffic light of the guide branch point will disappear from the view of the user) is associated with potential guidance prompt (1). Also, as the guidance ending point, a point "50 meters before the entrance side traffic light of the first branch point" (i.e., a point where the traffic light that is one traffic light before the entrance side traffic light of the guide branch point is easily visible up ahead by the user) is associated with potential guidance prompt (1). More specifically, with reference to FIG. 4, the guidance starting point is a point (A) that is five meters before an exit side traffic light 63 of a second branch point 62 that is a traffic light branch point two traffic light branch points before a guide branch point 61, and the guidance ending point is a point (B) that is 50 meters before an entrance side traffic light 65 of a first branch point 64 that is a traffic light branch point one traffic light branch point before the guide branch point 61. As a result, a user that has received guidance is able to count the two traffic lights, i.e., traffic light 65 (traffic light 66) and traffic light 67, before entering the guide branch point 61, and is thus able to clearly identify the "second light" in the guidance prompt as the entrance side traffic light 67 of the guide branch point 61. It should be noted that the traffic light 65 and the traffic light 66 that are at the same branch point are counted as one traffic light when counting.

Potential Guidance Prompt (2)

When performing the guidance "turn left (right) at the next light after this light", the guidance is required to start and finish being spoken (i.e., the output of voice guidance is required to be started and ended) while the user is able to understand that he or she is in front of the traffic light (i.e., "this light" in the guidance prompt) that is two traffic lights before the guide branch point, or while the user is able to understand that he or she is driving through the traffic light (i.e., "this light" in the guidance prompt) that is two traffic lights before the guide branch point. Therefore, as shown in FIG. 3, as the guidance starting point, the point nearest to the guide branch point (i.e., a point where the traffic light one traffic light before the entrance side traffic light of the guide branch point is closest to the vehicle and is easily visible ahead by the user), from among a point "100 meters before the entrance side traffic light of the first branch point" and a point "5 meters before the exit side traffic light of the second branch point," is associated with potential guidance prompt (2). Also, as the guidance ending point, a point "5 meters before the exit side traffic light of the first branch point" (that is, a point where the traffic light one traffic light before the entrance side traffic light of the guide branch point will disappear from the view of the user) is associated with potential guidance prompt (2). More specifically, with reference to FIG. 4, the guidance starting point is a point (C) that is 100 meters before the entrance side traffic light 65 of the first branch point 64 that is a traffic light branch point one traffic light branch point before the guide branch point 61, and the guidance ending point is a point (D) that is five meters before the exit side traffic light 66 of the first branch point 64 that is the traffic light branch point one traffic light branch point before the guide branch point 61. As a result, a user that has received guidance is able to understand that the traffic light 65 (traffic light 66) is "this light" in the guidance prompt, and is thus able to clearly identify "the next light" in the guidance prompt as the entrance side traffic light 67 of the guide branch point 61.

Potential Guidance Prompt (3)

When performing the guidance "turn left (right) at the next light after the light being driven through", the guidance is required to be started and finished (i.e., the output of voice guidance is required to be started and ended) while the user is able to understand that he or she is driving through a traffic light that is one traffic light (i.e., "the light being driven through" in this guidance prompt) before the guide branch point. Therefore, as shown in FIG. 3, as the guidance starting point, the point nearest to the guide branch point (i.e., a point where the traffic light one traffic light before the entrance side traffic light of the guide branch point is closest to the vehicle and is easily visible ahead by the user), from among a point "50 meters before the entrance side traffic light of the first branch point" and a point "5 meters before the exit side traffic light of the second branch point," is associated with potential guidance prompt (3). Also, as the guidance ending point, a point "5 meters before the entrance side traffic light of the guide branch point" (that is, a point where the entrance side traffic light of the guide branch point will disappear from the view of the user) is associated with potential guidance prompt (3). More specifically, with reference to FIG. 4, the guidance starting point is a point (E) that is 50 meters before the entrance side traffic light 65 of the first branch point 64 that is a traffic light branch point one traffic light branch point before the guide branch point 61, the guidance ending point is a point (F) that is 5 meters before the entrance side traffic light 67 of the guide branch point 61, and the continued guidance required point is a point (D) that is 5 meters before the exit side traffic light 66 of the first branch point 64 that is a traffic light branch point one traffic light branch point before the guide branch point 61. As a result, a user that has received guidance is able to understand that the traffic light 65 (traffic light 66) is "the light being driven through" in the guidance prompt, and is thus able to clearly identify "the next light" in the guidance prompt as the entrance side traffic light 67 of the guide branch point 61.

Other potential guidance prompts are also stored similarly in the potential guidance prompt conditions table 32. The guidance direction of the guide branch point may also be diagonally left (right), or a sharp right (left), or the like, in addition to left (right). Also, the time required to output the guidance may also change depending on the guidance direction. The navigation ECU 13 sets a guidance prompt that performs guidance for a guide branch point ahead of the vehicle, from among a plurality of potential guidance prompts, based on the shape of the guide route, the position information of traffic lights and branch points along the guide route, and the potential guidance prompt conditions table 32 and the like, as will be described later. For example, the potential guidance prompts (1) to (3) described above are potential guidance prompts for performing guidance for a guide branch point using a first branch point (more specifically, a traffic light at a first branch point), but the phrases referring to the first branch point (more specifically, a traffic light at the first branch point) differ from each other. Therefore, the navigation ECU 13 sets a potential guidance with the appropriate phrase referring to the first branch point as the guidance prompt of the guide branch point, taking into account the shape of the guide route, and the position information of the traffic lights and branch points on the guide route and the like, as will be described later.

Meanwhile, the navigation ECU 13 is an electronic control unit that controls the overall navigation system 1 The navigation ECU 13 includes a CPU 41 as a calculating device and a control device, RAM 42 that is used as working memory when the CPU 41 performs various calculations, and in which route data is stored when a route is searched for, and the like, ROM 43 in which is stored a branch point guidance processing program (see FIGS. 5 to 7, 9, and 11) that will be described later, in addition to control programs, and the like, and a internal storage device, such as flash memory 44, that stores programs read from the ROM 43, and the like. The navigation ECU 13 serves as various units of processing algorithms. For example, a guide route setting unit sets a guide route from a point of departure (such as the current position of the vehicle) to a destination, along which the vehicle (i.e., a movable object) is guided, and guide branch points. A branch point obtaining unit obtains a position of a first branch point that is closer to the point of departure of the guide route than the guide branch point, and a position of a second branch point that is closer to the point of departure than the first branch point. A guidance setting unit sets a guidance prompt for the guide branch point to a predetermined guidance prompt selected from among the plurality of potential guidance prompts. A branch point guidance unit performs guidance through the branch point using the predetermined guidance prompt set by the guidance setting unit. A traffic light information obtaining unit obtains position information of traffic lights around the guide route.

The operating portion 14 is operated when inputting a point of departure as a travel starting point, and a destination as a travel ending point, and is formed by a plurality of operating switches (not shown), such as various keys or buttons or the like. Also, the navigation ECU 13 performs control to execute various corresponding operations, based on a switch signal output in response to the switches being pressed or the like. The operating portion 14 may also be formed by a touch panel provided on the front surface of the LCD 15. The operating portion 14 may also be formed by a microphone and a voice recognition system.

The LCD 15 displays a map image that includes roads, traffic information, an operations guide, an operating menu, a key guide, a planned travel route from point of departure to destination, guidance information along the planned travel route, news, weather forecast, time of day, e-mail, and television programs, and the like. In particular, in this example embodiment, a magnified view of the area near a guide branch point and the direction of travel at the guide branch point are displayed when the vehicle comes to within a predetermined distance (such as 300 meters) of the guide branch point.

The speaker 16 outputs voice guidance that guides the vehicle along the planned travel route, and guidance regarding traffic information, based on commands from the navigation ECU 13. In particular, in this example embodiment, when the guide branch point is ahead of the vehicle, voice guidance for the guide branch point is output at a predetermined guidance start timing based on the guidance prompt (such as the timing when the vehicle comes to be 5 meters from the exit side traffic light of the second branch point (see FIG. 3), when outputting the voice guidance "turn left at the second traffic light.")

The DVD drive 17 is a drive capable of reading data stored on a storage medium such as a DVD or a CD. The DVD drive 17 is also used to update the map information DR 31, and play back music or video based on read data, and the like.

The communication module 18 is a communication device for receiving traffic information that includes various information such as congestion information, regulatory information, and traffic accident information and the like output from a traffic information center such as a VICS center or a probe center, for example. The communication module 18 corresponds to a mobile phone or DCM, for example.

Figure 5:
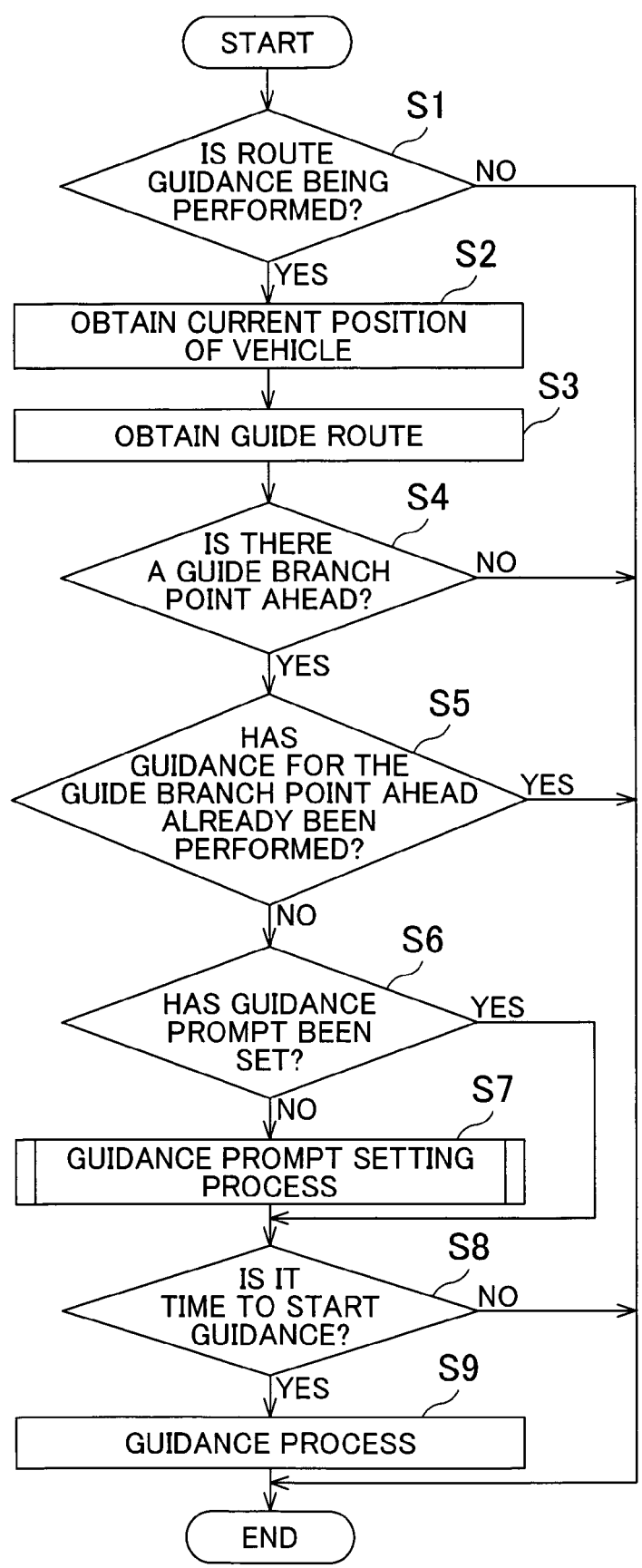
FIG. 5 is a flowchart of a branch point guidance processing program according to the example embodiment.

Next, a branch point guidance processing program executed by the navigation ECU 13 in the navigation system 1 having the structure described above will now be described with reference to FIG. 5. FIG. 5 is a flowchart of a branch point guidance processing program according to this example embodiment. The branch point guidance processing program is repeatedly executed at predetermined intervals after the ACC of the vehicle is turned on, and is a program that performs guidance for a guide branch point on a guide route. The program shown in the flowchart in FIGS. 5 to 7, 9, and 11 is stored in the RAM 42 and the RAM 43 provided in the navigation system 1, and is executed by the CPU 41.

First in the branch point guidance processing program, in step S1, the CPU 41 determines whether route guidance based on a guide route set in the navigation system 1 is being performed. Here, the guide route is a recommended route from the point of departure (such as the current position of the host vehicle) to a destination selected by the user, and is set based on the results of a route searching process. Also, the route searching process is performed by a known Dijkstra method or the like, using the link data 33 and the node data 34 stored in the map information DB 31, and traffic information obtained from the VICS center, and the like.

If it is determined that route guidance based on a guide route set in the navigation system 1 is being performed (i.e., YES in step S1), then the process proceeds on to step S2. If, on the other hand, it is determined that route guidance based on a guide route set in the navigation system 1 is not being performed (i.e., NO in step S1), then the branch point guidance processing program ends.

In step S2, the CPU 41 obtains the current position of the vehicle based on the detection results of the current position detecting portion 11. Also, a map matching process that identifies the current position of the vehicle on map data is also performed. Furthermore, the current position of the vehicle is preferably identified in detail using highly accurate location technology. Highly accurate location technology in this case is technology that is able to detect a running lane and the precise vehicle position, by detecting, through image recognition, white lines and road paint information taken by a camera that takes an image of the area behind the vehicle, and then matching the detected white lines and road paint information with white lines and road paint information stored in advance in a map database DB. The details of the highly accurate location technology are already well known, and will therefore be omitted.

Next, in step S3, the CPU 41 obtains the guide route set in the navigation system 1.

Subsequently, in step S4, the CPU 41 determines whether there is a guide branch point within a predetermined distance (such as within 1 kilometer) ahead of the vehicle, based on the current position of the vehicle obtained in step S1 and the guide route obtained in step S2. The guide branch point is a branch point for which guidance for a left or right turn prompt or the like is to be performed when the navigation system 1 performs travel guidance according to the guide route set in the navigation system 1 as described above.

If it is determined that there is a guide branch point within a predetermined distance ahead of the vehicle (i.e., YES in step S4), the process proceeds on to step S5. If, on the other hand, it is determined that there is not a guide branch point within the predetermined distance ahead of the vehicle (i.e., NO in step S4), the branch point guidance processing program ends.

In step S5, the CPU 41 determines whether guidance for a guide branch point that is ahead of the vehicle has already been performed. In step S5, the CPU 41 determines whether voice guidance that gives a prompt for a left or right turn or the like at the guide branch point in particular, in the guidance for the guide branch point, has been performed.

If it is determined that guidance for a guide branch point that is ahead of the vehicle has already been performed (i.e., YES in step S5), then the branch point guidance processing program ends. If, on the other hand, it is determined that guidance for a guide branch point that is ahead of the vehicle has not already been performed (i.e., NO in step S5), then the process proceeds on to step S6.

In step S6, the CPU 41 determines whether the guidance prompt for the guide branch point that is ahead of the vehicle has already been set in a guidance prompt setting step (step S7) that will be described later. In step S6, the CPU 41 determines whether the guidance prompt of the voice guidance that gives a prompt for a left or right turn or the like at the guide branch point in particular, in the guidance for the guide branch point, has been performed.

If it is determined that the guidance prompt for a guide branch point that is ahead of the vehicle has already been set (i.e., YES in step S6), then the process proceeds on to step S8. If, on the other hand, it is determined that the guidance prompt for a guide branch point that is ahead of the vehicle has not yet been set (i.e., NO in step S6), then the process proceeds on to step S7.

In step S7, the CPU 41 executes a guidance prompt setting process (FIG. 6) that will be described later. The guidance prompt setting process is a process that selects and sets the optimum guidance prompt for performing guidance for a guide branch point ahead of the vehicle, from among a plurality of potential guidance prompts set forth in the potential guidance prompt conditions table 32, as will be described later.

Next in step S8, the CPU 41 determines whether it is time to perform guidance based on the potential guidance prompt set for the guidance prompt in step S7. More specifically, it is determined whether the vehicle has reached a guidance starting point (see FIG. 3) associated with the potential guidance prompt set for the guidance prompt in step S7. For example, if a potential guidance prompt of "turn left (right) at the second light" is set for the guidance prompt in step S7 described above, then it is determined that it is time to perform guidance when the vehicle has reached "5 meters before the exit side traffic light of the second branch point."

If it is determined that it is time to perform guidance based on the potential guidance prompt set to the guidance prompt in step S7 (i.e., YES in step S8), the process proceeds on to step S9. If, on the other hand, it is determined that it is not time to perform guidance based on the potential guidance prompt set to the guidance prompt in step S7 (i.e., NO in step S8), the branch point guidance processing program ends.

In step S9, the CPU 41 performs guidance related to the guide branch point, based on the potential guidance prompt set as the guidance prompt in step S7. More specifically, the CPU 41 performs guidance for identifying the direction in which the vehicle will exit the guide branch point (i.e., guidance for identifying the exit road that the vehicle will travel on when exiting the guide branch point). For example, when the potential guidance prompt "turn left (right) at the second light" is set as the guidance prompt in step S7, the phrase "turn left (right) at the second light" is output from the speaker 16. Furthermore, when the vehicle comes to within a predetermined distance (such as 300 meters) of the guide branch point, an magnified view of the area near the guide branch point and the direction of travel at the guide branch point are displayed on the LCD 15. As a result, the guide branch point and the road on which the vehicle will travel to exit the guide branch point can be more accurately identified to the user.

Figure 6:
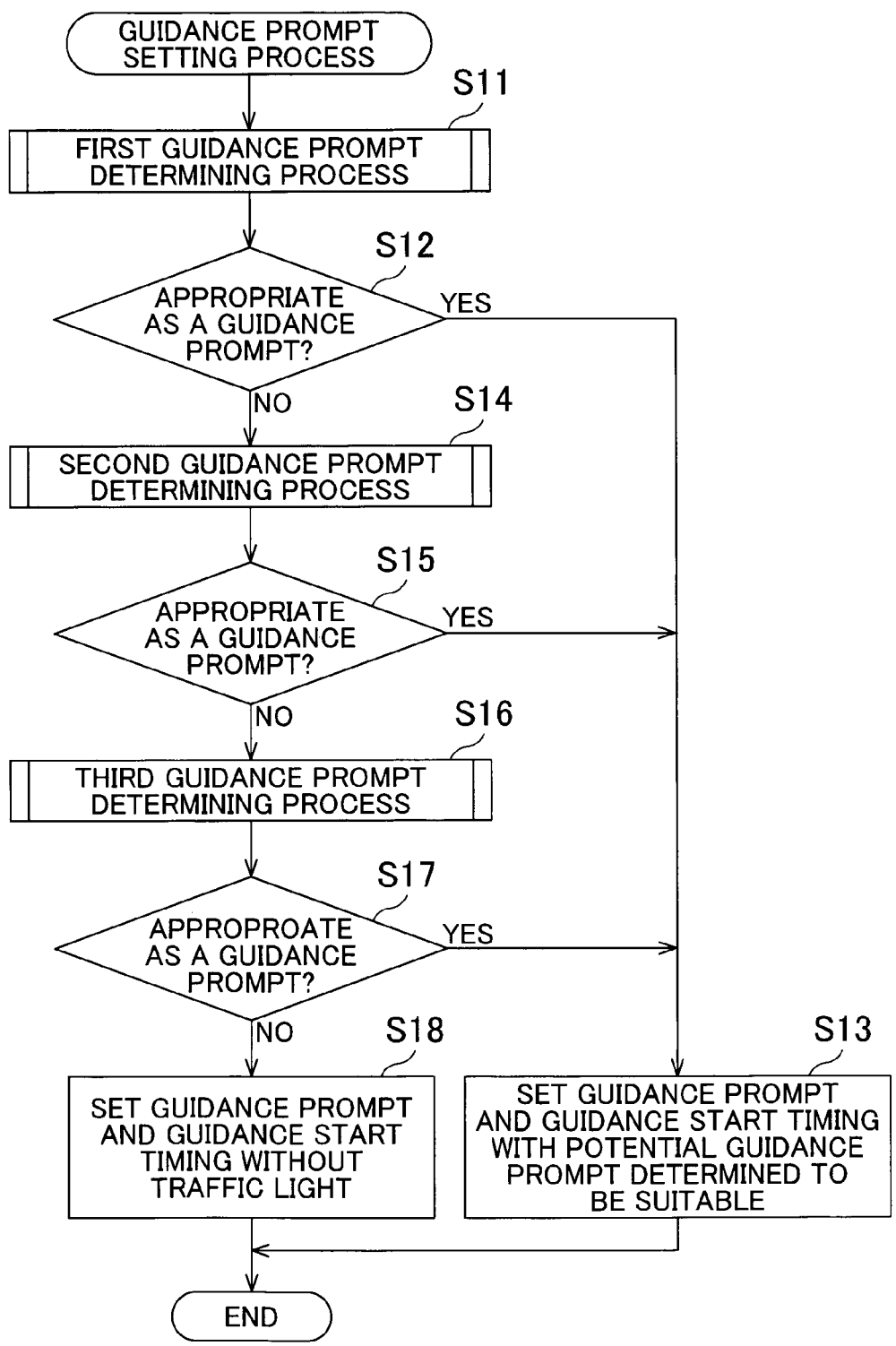
FIG. 6 is a flowchart of a sub-processing program of a guidance prompt setting process according to the example embodiment.

Next, the sub-process of the guidance prompt setting process executed in step S7 will be described with reference to FIG. 6. FIG. 6 is a flowchart of the sub-process of the guidance prompt setting process.

First, in step S11, the CPU 41 executes a first guidance prompt determining process (FIG. 7) that will be described later. The first guidance prompt determining process is a process for determining whether potential guidance prompt (1) that speaks the phrase "turn left (right) at the second light", among the plurality of potential guidance prompts set forth in the potential guidance prompt conditions table 32, is suitable as a guidance prompt for performing guidance for the guide branch point ahead of the vehicle, as will be described later.

Next, in step S12, the CPU 41 determines whether potential guidance prompt (1) is suitable as a guidance prompt for performing guidance for the guide branch point ahead of the vehicle, as a result of the determination of the first guidance prompt determining process in step S11.

If it is determined that potential guidance prompt (1) is suitable as a guidance prompt for performing guidance for the guide branch point ahead of the vehicle (i.e., YES in step S12), the process proceeds on to step S13. If, on the other hand, it is determined that potential guidance prompt (1) is not suitable as a guidance prompt for performing guidance for the guide branch point ahead of the vehicle (i.e., NO in step S12), the process proceeds on to step S14.

In step S13, the CPU 41 sets potential guidance prompt (1) as the guidance prompt for performing the guidance for the guide branch point ahead of the vehicle. Also, the CPU 41 sets the timing at which the vehicle reaches the guidance starting point associated with potential guidance prompt (1) as the start timing of guidance for the guide branch point ahead of the vehicle. Then the guidance prompt setting process ends and the process proceeds to step S8.

In step S14, the CPU 41 executes a second guidance prompt determining process (FIG. 9) that will be described later. This second guidance prompt determining process is a process for determining whether potential guidance prompt (2) that speaks the phrase "turn left (right) at the next light after this light", among the plurality of potential guidance prompts set forth in the potential guidance prompt conditions table 32, is suitable as a guidance prompt for performing guidance for the guide branch point ahead of the vehicle, as will be described later.

Next, in step S15, the CPU 41 determines whether potential guidance prompt (2) is suitable as a guidance prompt for performing guidance for the guide branch point ahead of the vehicle, as a result of the determination of the second guidance prompt determining process in step S14.

If it is determined that potential guidance prompt (2) is suitable as a guidance prompt for performing guidance for the guide branch point ahead of the vehicle (i.e., YES in step S15), the process proceeds on to step S13. If on the other hand, it is determined that potential guidance prompt (2) is not suitable as a guidance prompt for performing guidance for the guide branch point ahead of the vehicle (i.e., NO in step S15), the process proceeds on to step S16.

In step S13, the CPU 41 sets potential guidance prompt (2) as the guidance prompt for performing the guidance for the guide branch point ahead of the vehicle. Also, the CPU 41 sets the timing at which the vehicle reaches the guidance starting point associated with potential guidance prompt (2) as the start timing of guidance for the guide branch point ahead of the vehicle. Then the guidance prompt setting process ends and the process proceeds to step S8.

In step S14, the CPU 41 executes a third guidance prompt determining process (FIG. 11) that will be described later. This third guidance prompt determining process is a process for determining whether potential guidance prompt (3) that speaks the phrase "turn left (right) at the next light after the light being driven through", among the plurality of potential guidance prompts set forth in the potential guidance prompt conditions table 32, is suitable as a guidance prompt for performing guidance for the guide branch point ahead of the vehicle, as will be described later.

Next, in step S17, the CPU 41 determines whether potential guidance prompt (3) is suitable as a guidance prompt for performing guidance for the guide branch point ahead of the vehicle, as a result of the determination of the third guidance prompt determining process in step S16.

If it is determined that potential guidance prompt (3) is suitable as a guidance prompt for performing guidance for the guide branch point ahead of the vehicle (i.e., YES in step S17), the process proceeds on to step S13. If, on the other hand, it is determined that potential guidance prompt (3) is not suitable as a guidance prompt for performing guidance for the guide branch point ahead of the vehicle (i.e., NO in step S17), the process proceeds on to step S18.

In step S13, the CPU 41 sets potential guidance prompt (3) as the guidance prompt for performing the guidance for the guide branch point ahead of the vehicle. Also, the CPU 41 sets the timing at which the vehicle reaches the guidance starting point associated with potential guidance prompt (3) as the start timing of guidance for the guide branch point ahead of the vehicle. Then the guidance prompt setting process ends and the process proceeds to step S8.

On the other hand, in step S18, the CPU 41 sets a potential guidance prompt without a traffic light as the guidance prompt for performing the guidance for the guide branch point ahead of the vehicle. A potential guidance prompt without a traffic light includes, for example, guidance that speaks the phrase "turn right (left) soon" and guidance that speaks the phrase "turn right (left) in 300 meters (700 meters)." Also, a timing at which the vehicle reaches the guidance starting point associated with the set potential guidance prompt (for example, with "turn right (left) in 300 meters," the timing at which the vehicle is 300 meters from the guide branch point) is set as the start timing for guidance for a guide branch point ahead of the vehicle. Then the guidance prompt setting process ends, and the process proceeds on to step S8.

Also, when comparing the guidance starting points associated with potential guidance prompt (1) that is determined in step S11, potential guidance prompt (2) that is determined in step S14, and potential guidance prompt (3) that is determined in step S16, the guidance starting point associated with potential guidance prompt (1) that is determined in step S11 is closest to the point of departure of the guide route, and the guidance starting point associated with potential guidance prompt (3) that is determined in step S16 is closest to the guide branch point. Thus, when there are a plurality of potential guidance prompts that are determined to be suitable as guidance prompts for performing guidance for a guide branch point ahead of the vehicle, the potential guidance prompt with the guidance starting point that is closer to the point of departure (i.e., with an earlier timing for starting guidance) is preferentially set as the guidance prompt for the guide branch point.

Figure 7:
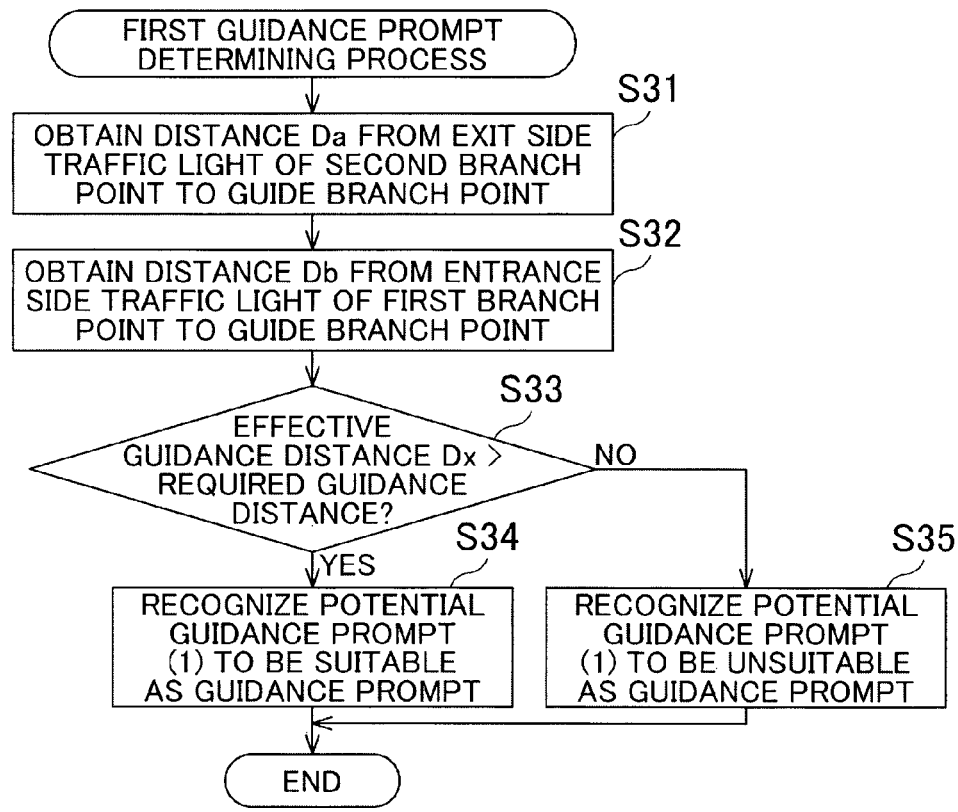
FIG. 7 is a flowchart of a sub-processing program of a first guidance prompt determining process according to the example embodiment.

Next, the sub-process of the first guidance prompt determining process executed in step S11 will be described with reference to FIG. 7. FIG. 7 is a flowchart of the sub-processing program of the first guidance prompt determining process.

Figure 8:
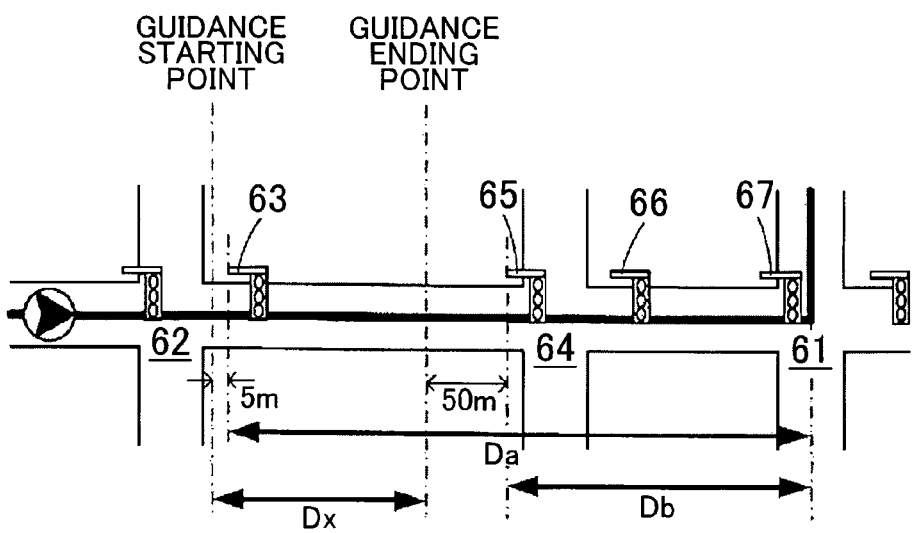
FIG. 8 is a view illustrating a determination method of the sub-processing program of the first guidance prompt determining process.

First, in step S31, the CPU 41 obtains a distance Da from the exit side traffic light 63 of the second branch point 62, that is a traffic light branch point two traffic light branch points before the guide branch point 61, to the guide branch point 61, based on the link data 33, the node data 34, and the branch point data 35 and the like stored in the map information DB 31 (see FIG. 8).

Next, in step S32, the CPU 41 obtains a distance Db from the entrance side traffic light 65 of the first branch point 64, that is a traffic light branch point one traffic light branch point before the guide branch point 61, to the guide branch point 61, based on the link data 33, the node data 34, and the branch point data 35 and the like stored in the map information DB 31 (see FIG. 8).

Subsequently, the CPU 41 determines whether a differential distance Dx of i) the distance of the distance Da plus 5 meters and ii) the distance of the distance Db plus 50 meters (i.e., the effective guidance distance from the guidance starting point to the guidance ending point) is greater than a required guidance distance necessary to speak the guidance "turn left (right) at the second light," that is, when guidance is started at the guidance starting point associated with potential guidance prompt (1), whether this guidance is able to be finished by the time the vehicle reaches the guidance ending point also associated with potential guidance prompt (1). The required guidance distance is a distance obtained by multiplying a predetermined vehicle speed (such as 60 km/h) by the time (such as 4 seconds) required to output the guidance (i.e., voice guidance) stored in the potential guidance prompt conditions table 32. The predetermined vehicle speed may be changed depending on the type of road on which the vehicle is traveling (for example, 60 km/h for a national highway or a prefectural road, and 40 km/h for regular roads).

If it is determined that the effective guidance distance is greater than the required guidance distance (i.e., YES in step S33), i.e., if it is determined that, when the guidance starts to be spoken at the guidance starting point associated with potential guidance prompt (1), the guidance is able to finish being spoken by the time the vehicle reaches the guidance ending point also associated with potential guidance prompt (1), potential guidance prompt (1) is recognized to be suitable as a guidance prompt for performing guidance for the guide branch point ahead of the vehicle (step S34), and the first guidance prompt setting process ends. As a result, as described above, in step S13, the CPU 41 sets potential guidance prompt (1) that speaks the phrase "turn left (right) at the second light" as the guidance prompt for performing the guidance for the guide branch point ahead of the vehicle.

If, on the other hand, it is determined that the effective guidance distance is equal to or less than the required guidance distance (i.e., NO in step S33), i.e., if it is determined that, when the guidance starts to be spoken at the guidance starting point associated with potential guidance prompt (1), the guidance is unable to be finished being spoken by the time the vehicle reaches the guidance ending point also associated with potential guidance prompt (1), then potential guidance prompt (1) is recognized as being unsuitable as a guidance prompt for performing guidance for the guide branch point ahead of the vehicle (step S35), and the first guidance prompt setting process ends. Then the process proceeds on to step S12.

Figure 9:
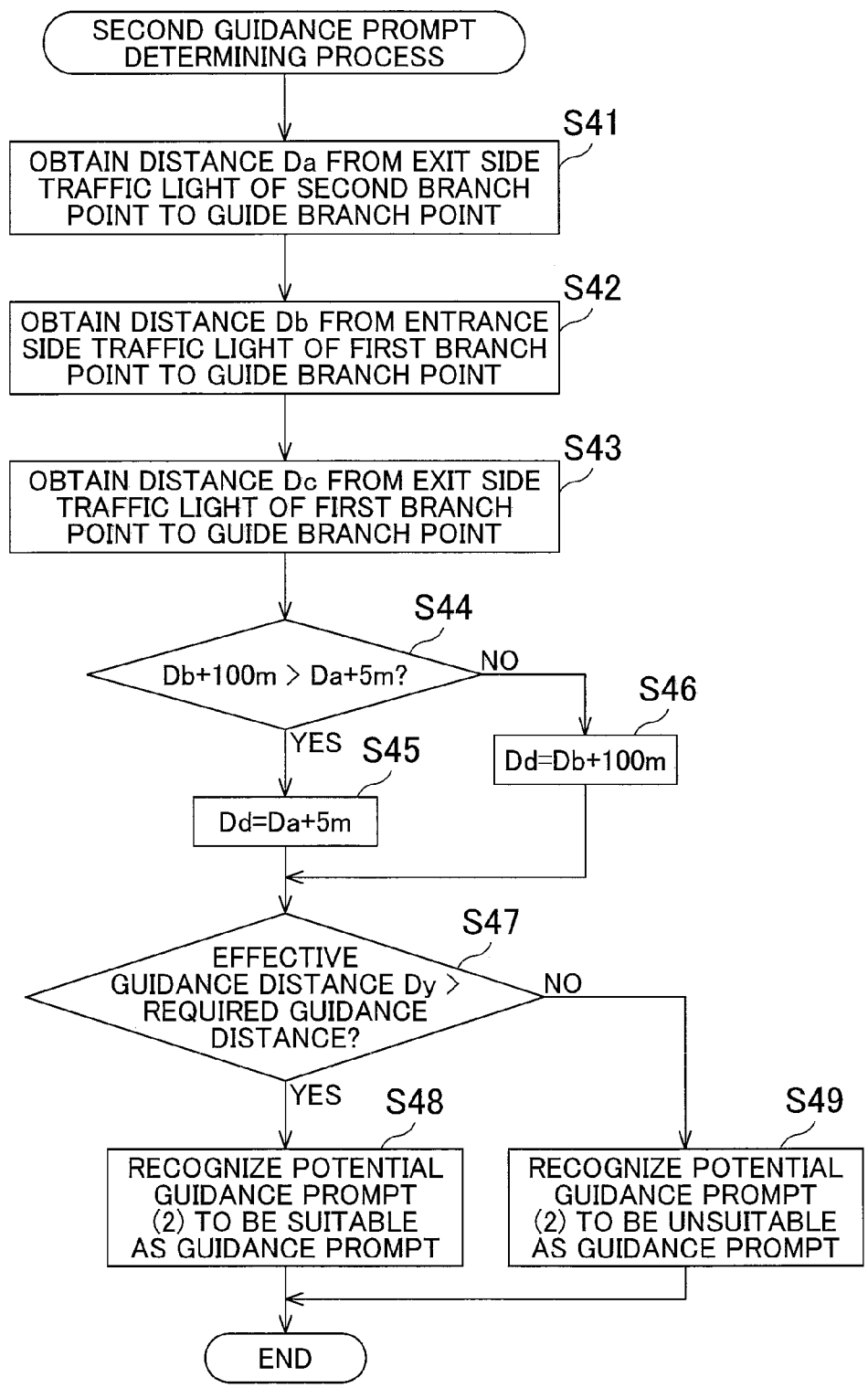
FIG. 9 is a flowchart of a sub-processing program of a second guidance prompt determining process according to the example embodiment.

Next, a sub-process of a second guidance prompt determining process executed in step S14 will be described with reference to FIG. 9. FIG. 9 is a flowchart of the sub-process of the second guidance prompt determining process.

Figure 10:
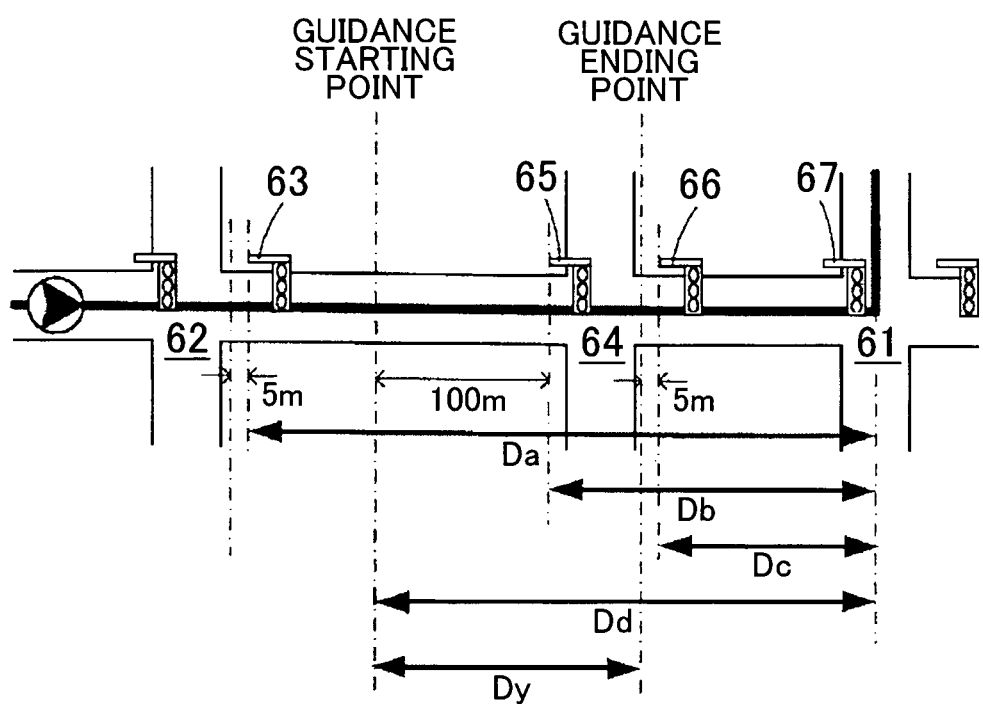
FIG. 10 is a view illustrating a determination method of the sub-processing program of the second guidance prompt determining process.

First, in step S41, the CPU 41 obtains a distance Da from the exit side traffic light 63 of the second branch point 62, that is a traffic light branch point two traffic light branch points before the guide branch point 61, to the guide branch point 61, based on the link data 33, the node data 34, and the branch point data 35 and the like stored in the map information DB 31 (see FIG. 10).

Next, in step S42, the CPU 41 obtains a distance Db from the entrance side traffic light 65 of the first branch point 64, that is a traffic light branch point one traffic light branch point before the guide branch point 61, to the guide branch point 61, based on the link data 33, the node data 34, and the branch point data 35 and the like stored in the map information DB 31 (see FIG. 10).

Subsequently, in step S43, the CPU 41 obtains a distance Dc from the exit side traffic light 66 of the first branch point 64, that is a traffic light branch point one traffic light branch point before the guide branch point 61, to the guide branch point 61, based on the link data 33, the node data 34, and the branch point data 35 and the like stored in the map information DB 31 (see FIG. 10).

Next, in step S44, the CPU 41 determines whether the distance of the distance Db plus 100 meters is greater than the distance of the distance Da plus 5 meters.

If it is determined that the distance of the distance Db plus 100 meters is greater than the distance of the distance Da plus five meters (i.e., YES in step S44), then the CPU 41 selects "5 meters before the exit side traffic light of the second branch point" as the guidance starting point to start speaking the guidance. Also, the CPU 41 sets a distance Dd from the guidance starting point to the guide branch point, to the distance of the distance Da plus 5 meters (step S45).

If, on the other hand, it is determined that the distance of the distance Db plus 100 meters is equal to or less than the distance of the distance Da plus 5 meters (i.e., NO in step S44), then the CPU 41 selects "100 meters before the entrance side traffic light of the first branch point" as the guidance starting point to start speaking the guidance. Also, the CPU 41 sets the distance Dd from the guidance starting point to the guide branch point, to the distance of the distance Db plus 100 meters (step S46). For example, in the example shown in FIG. 10, the distance of the distance Da plus 5 meters is greater than the distance of the distance Db plus 100 meters, so "100 meters before the entrance side traffic light 65 of the first branch point 64" is selected as the guidance starting point to start speaking the guidance.

Next, in step S47, the CPU 41 determines whether a differential distance Dy of i) a distance Dd, and ii) a distance of a distance Dc plus 5 meters (i.e., the effective guidance distance from the guidance starting point to the guidance ending point) is greater than a required guidance distance necessary to speak the guidance "turn left (right) at the next light after this light," that is, when guidance starts to be spoken at the guidance starting point associated with potential guidance prompt (2), whether this guidance is able to be finished by the time the vehicle reaches the guidance ending point also associated with potential guidance prompt (2). The required guidance distance is a distance obtained by multiplying a predetermined vehicle speed (such as 60 km/h) by the time (such as 4 seconds) required to output the guidance (i.e., voice guidance) stored in the potential guidance prompt conditions table 32. The predetermined vehicle speed may be changed depending on the type of road on which the vehicle is traveling (for example, 60 km/h for a national highway or a prefectural road, and 40 km/h for regular roads).

If it is determined that the effective guidance distance is greater than the required guidance distance (i.e., YES in step S47), i.e., if it is determined that, when the guidance starts to be spoken at the guidance starting point associated with potential guidance prompt (2), the guidance is able to finish being spoken by the time the vehicle reaches the guidance ending point also associated with potential guidance prompt (2), potential guidance prompt (2) is recognized to be suitable as a guidance prompt for performing guidance for the guide branch point ahead of the vehicle (step S48), and the second guidance prompt setting process ends. As a result, as described above, in step S13, the CPU 41 sets potential guidance prompt (2) that speaks the phrase "turn left (right) at the next light after this light" as the guidance prompt for performing the guidance for the guide branch point ahead of the vehicle.

If, on the other hand, it is determined that the effective guidance distance is equal to or less than the required guidance distance (i.e., NO in step S47), i.e., if it is determined that when the guidance starts to be spoken at the guidance starting point associated with potential guidance prompt (2), the guidance is unable to finish being spoken by the time the vehicle reaches the guidance ending point also associated with potential guidance prompt (2), then potential guidance prompt (2) is recognized as being unsuitable as a guidance prompt for performing guidance for the guide branch point ahead of the vehicle (step S49), and the second guidance prompt setting process ends. Then the process proceeds on to step S15.

Figure 11:
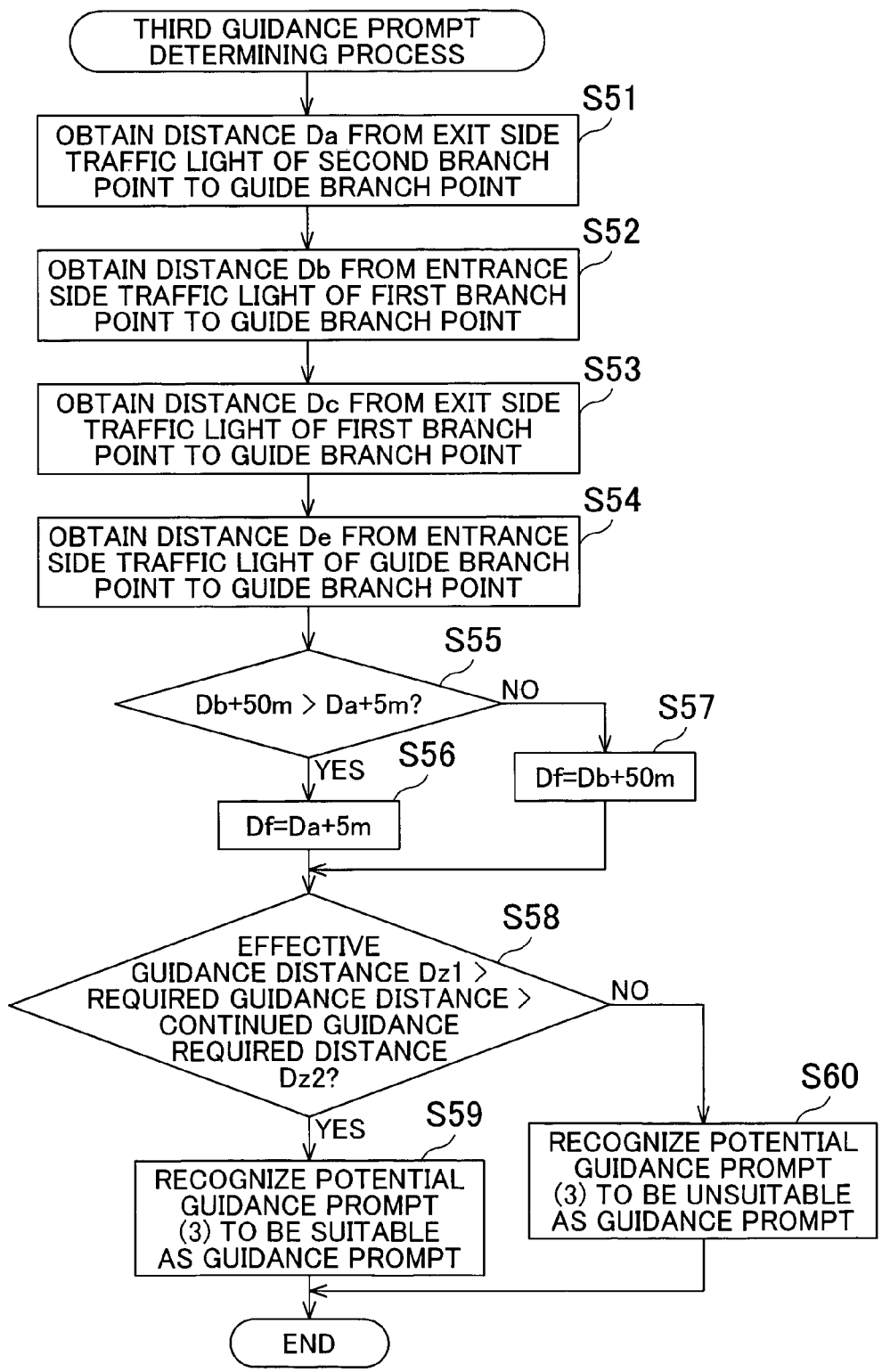
FIG. 11 is a flowchart of a sub-processing program of a third guidance prompt determining process according to the example embodiment.

Next, a sub-process of a third guidance prompt determining process executed in step S16 will be described with reference to FIG. 11. FIG. 11 is a flowchart of the sub-process of the third guidance prompt determining process.

Figure 12:
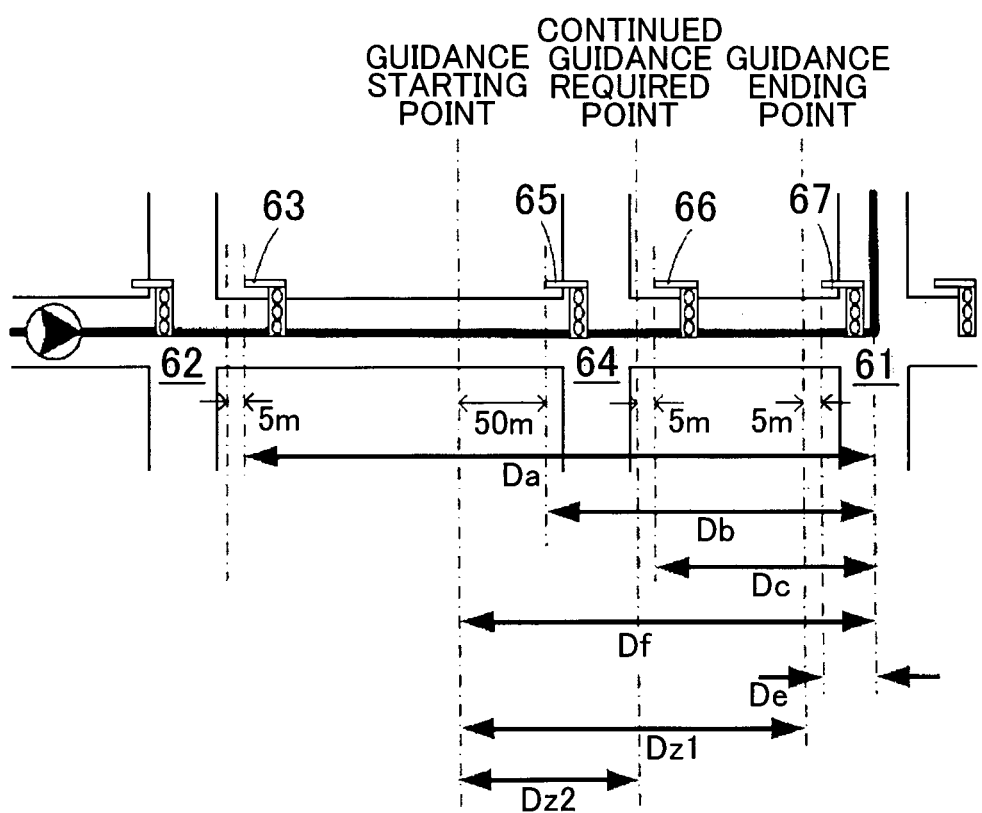
FIG. 12 is a view illustrating a determination method of the sub-processing program of the third guidance prompt determining process.

First, in step S51, the CPU 41 obtains a distance Da from the exit side traffic light 63 of the second branch point 62, that is a traffic light branch point two traffic light branch points before the guide branch point 61, to the guide branch point 61, based on the link data 33, the node data 34, and the branch point data 35 and the like stored in the map information DB 31 (see FIG. 12).

Next, in step S52, the CPU 41 obtains a distance Db from the entrance side traffic light 65 of the first branch point 64, that is a traffic light branch point one traffic light branch point before the guide branch point 61, to the guide branch point 61, based on the link data 33, the node data 34, and the branch point data 35 and the like stored in the map information DB 31 (see FIG. 12).

Subsequently, in step S53, the CPU 41 obtains a distance Dc from the exit side traffic light 66 of the first branch point 64, that is a traffic light branch point one traffic light branch point before the guide branch point 61, to the guide branch point 61, based on the link data 33, the node data 34, and the branch point data 35 and the like stored in the map information DB 31 (see FIG. 12).

Furthermore, in step S54, the CPU 41 obtains a distance De from the entrance side traffic light 67 of the guide branch point 61 to the guide branch point 61, based on the link data 33, the node data 34, and the branch point data 35 and the like stored in the map information DB 31 (see FIG. 12).

Next, in step S55, the CPU 41 determines whether the distance of the distance Db plus 50 meters is greater than the distance of the distance Da plus 5 meters.

If it is determined that the distance of the distance Db plus 50 meters is greater than the distance of the distance Da plus 5 meters (i.e., YES in step S55), then the CPU 41 selects "5 meters before the exit side traffic light of the second branch point" as the guidance starting point to start speaking the guidance. Also, the CPU 41 sets a distance Df from the guidance starting point to the guide branch point, to the distance of the distance Da plus 5 meters (step S56).

If, on the other hand, it is determined that the distance of the distance Db plus 50 meters is equal to or less than the distance of the distance Da plus 5 meters (i.e., NO in step S55), then the CPU 41 selects "50 meters before the entrance side traffic light of the first branch point" as the guidance starting point to start speaking the guidance. Also, the CPU 41 sets the distance Df from the guidance starting point to the guide branch point, to the distance of the distance Db plus 50 meters (step S57). For example, in the example shown in FIG. 12, the distance of the distance Da plus 5 meters is greater than the distance of the distance Db plus 50 meters, so "50 meters before the entrance side traffic light 65 of the first branch point 64" is selected as the guidance starting point to start speaking the guidance.

Next, in step S58, the CPU 41 determines whether the required guidance distance necessary to speak the guidance "turn left (right) at the next light after the light being driven through" is less than a differential distance Dz1 of i) the distance Df, and ii) the distance of the distance De plus 5 meters (i.e., the effective guidance distance from the guidance starting point to the guidance ending point), and greater than a differential distance Dz2 of i) the distance Df, and ii) the distance of the distance Dc plus 5 meters (i.e., the continued guidance required distance from the guidance starting point to the continued guidance required point). That is, in step S58, the CPU 41 determines whether a condition in which, when the guidance starts to be spoken at the guidance starting point associated with potential guidance prompt (3), the guidance is able to finish being spoken by the time the vehicle reaches the guidance ending point also associated with potential guidance prompt (3), and the guidance continues to be spoken until the vehicle reaches the continued guidance required point, is satisfied. The required guidance distance is a distance obtained by multiplying a predetermined vehicle speed (such as 60 km/h) by the time (such as 6 seconds) required to output the guidance (i.e., voice guidance) stored in the potential guidance prompt conditions table 32. The predetermined vehicle speed may be changed depending on the type of road on which the vehicle is traveling (for example, 60 km/h for a national highway or a prefectural road, and 40 km/h for regular roads).

If it is determined that the required guidance distance is less than the effective guidance distance, and greater than the continued guidance required distance (i.e., YES in step S58), i.e., if it is determined that a condition in which, when the guidance starts to be spoken at the guidance starting point associated with potential guidance prompt (3), the guidance is able to finish being spoken by the time the vehicle reaches the guidance ending point also associated with potential guidance prompt (3), and the guidance continues to be spoken until the vehicle reaches the continued guidance required point, is satisfied, then potential guidance prompt (3) is recognized to be suitable as a guidance prompt for performing guidance for the guide branch point ahead of the vehicle (step S59), and the third guidance prompt setting process ends. As a result, as described above, in step S13, the CPU 41 sets potential guidance prompt (3) that speaks the phrase "turn left (right) at the next light after the light being driven through" as the guidance prompt for performing the guidance for the guide branch point ahead of the vehicle.

If, on the other hand, it is determined that the required guidance distance is equal to or greater than the effective guidance distance, or the required guidance distance is equal to or less than the continued guidance required distance (i.e., NO in step S58), i.e., if it is determined that, when the guidance starts to be spoken at the guidance starting point associated with potential guidance prompt (3), the guidance is unable to finish being spoken by the time the vehicle reaches the guidance ending point also associated with potential guidance prompt (3), or the guidance finishes being spoken by the time the vehicle reaches the continued guidance required point, potential guidance prompt (3) is recognized to be unsuitable as a guidance prompt for performing guidance for the guide branch point ahead of the vehicle (step S60), and the third guidance prompt setting process ends. Thereafter, the process proceeds on to step S17. As a result, the optimum guidance prompt for performing guidance for the guide branch point ahead of the vehicle is selected from among the plurality of guidance prompts set forth in the potential guidance prompt conditions table 32, and set as the guidance prompt for performing the guidance for the guide branch point. In particular, in this example embodiment, a potential guidance prompt with a suitable phrase referring to the first branch point (more specifically, the traffic light at the first branch point) is set as the guidance prompt of the guide branch point.

As described in detail above, according to the navigation system 1 according to this example embodiment, the travel guidance method using this navigation system 1, and the computer program executed by the navigation system 1, a plurality of potential guidance prompts are associated with the guidance starting point where guidance starts to be spoken, and the guidance ending point that is the point by which guidance is required to be finished being spoken, and are included in the potential guidance prompt conditions table 32. Also, a suitable guidance prompt for performing a guidance for a guide branch point ahead of the vehicle is selected from among a plurality of types of guidance prompts, based on whether the effective guidance distance (i.e., the guidance distance) that is the distance from the guidance starting point to the guidance ending point is greater than the required guidance distance (i.e., the speaking travel distance) that is the distance traveled by the movable object while guidance is being spoken. Also, the potential guidance prompt selected in this way is set as the guidance prompt for performing the guidance for the guide branch point (steps S12 and S13), and the guidance for the guide branch point is performed (step S9) according to the set guidance prompt when the vehicle reaches the guidance starting point associated with the set guidance prompt. As a result, it is possible to set a suitable guidance prompt for performing guidance for the guide branch point, taking into account the timing at which the guidance will start being spoken and the timing by which the guidance is required to be finished being spoken which are based on the position of the branch point, from among the plurality of potential guidance prompts, and perform the guidance for the guide branch point. Therefore, even if one potential guidance prompt is unsuitable to perform guidance for the guide branch point, the guidance is able to be performed using another potential guidance prompt that is suitable, thus enabling a situation in which guidance for the guide branch point is not performed, as is the case with the related art. Also, even in urban central areas and the like where the distances between traffic lights and branch points are short, for example, it is possible to more accurately identify a guide branch point to the user. Also, it is possible to more accurately identify a guide branch point to the user than it is when guiding the vehicle using the distance to the guide branch point. Further, a potential guidance prompt for which it has been determined that the effective guidance distance is greater than the required guidance distance is set as the guidance prompt for the guide branch point. As a result, it is possible to perform guidance in which there is no inconsistency between the guidance prompt and what the user actually sees. Therefore, the guide branch point is able to be more accurately identified to the user. Also, if there are a plurality of potential guidance prompts for which guidance will finish being spoken by the time the vehicle reaches the guidance ending point when guidance starts to be spoken at the guidance starting point, a potential guidance prompt in which guidance will be started at an early timing is preferentially set as the guidance prompt for the guide branch point. As a result, guidance for the guide branch point can be performed for the user as early as possible. Therefore, the user is able to drive appropriately. In the plurality of potential guidance prompts, are potential guidance prompts that perform guidance for the guide branch point using a branch point (i.e., the first branch point) one branch point before the guide branch point is used for performing guidance for the guide branch point. In this case, the plurality of potential guidance prompts include different phrases referring to the first branch point. Thus, even with guidance prompts that use the same first branch point, various guidance corresponding to the road shape and the state of the movable object can be realized by changing the phrase referring to the first branch point. A point a predetermined distance away from one of the first branch point and the branch point (i.e., the second branch point) two branch points before the guide branch point is set as the guidance starting point for each of the plurality of potential guidance prompts. As a result, it is possible to have the guidance start being spoken at an appropriate timing determined based on the relative position with the one of the first branch point and the second branch point. Also, with at least one of the potential guidance prompts, from among the plurality of potential guidance prompts, the guidance ending point is set closer to the guide branch point than the first branch point, and with the other potential guidance prompts, the guidance ending point is set closer to the point of departure than the first branch point. As a result, the guidance is able to finish being spoken at an appropriate timing determined based on the relative position with the one of the first branch point and the guide branch point. Also, with a specific potential guidance prompt ("turn left (right) at the next light after the light being driven through" in this example embodiment), the continued guidance required point is further set between the guidance starting point and the guidance ending point, and if it is determined that the effective guidance distance that is the distance from the guidance starting point to the guidance ending point is greater than the required guidance distance, and the continued guidance required distance is less than the required guidance distance, the specific potential guidance prompt is set as the guidance prompt for the guide branch point (step S59). As a result, it is also possible to set a suitable guidance prompt for performing guidance for the guide branch point also taking into account the passing point of the movable object while guidance is being spoken, and perform the guidance for the guide branch point. Therefore, it is possible to perform guidance in which there is no inconsistency between the guidance prompt and what the user actually sees. Also, as in this example embodiment, defining the position of each branch point by a traffic light near the branch point makes it possible to more accurately identify each position of the guidance starting point, the guidance ending point, and the continued guidance required point. In addition, it is possible to set a suitable guidance prompt to perform guidance for the guide branch point from among the plurality of potential guidance prompts, based on the positional relationship of the traffic light near the guide route. Also, the plurality of potential guidance prompts identify at least one of the first branch point, the second branch point, and the guide branch point using a traffic light. Therefore, guidance for the guide branch point can be performed by a clear guidance prompt using the traffic light. Also, it is possible to inhibit a traffic light indicated by a guidance prompt from being mistaken for another traffic light by the user, so the guide branch point is able to be more accurately identified to the user.

The invention is not limited to the example embodiments described above, but may of course be carried out in modes that have been modified or improved in any of a variety of ways within the scope of the invention. For example, in the example embodiment, guidance is performed by being output by voice guidance from the speaker 16, but guidance may also be performed by displaying text on the LCD 15.

Also, in the example embodiment, the guidance starting point, the guidance ending point, and the continued guidance required point are identified based on the position of an entrance side traffic light or an exit side traffic light near a branch point. Alternatively, however, they may be identified based on the position of the branch point (i.e., the guide branch point, the first branch point, and the second branch point) itself. In this case, the guidance for the guide branch point is preferably performed by guidance using a branch point, not a traffic light (for example, "turn left (right) at the second branch point," "turn left (right) at the next branch point after this branch point," and "turn left (right) at the next branch point after the branch point being driven through," and the like). With the structure described above that uses a branch point, the traffic light information 36 is unnecessary.

Also, in the example embodiment, when the guide branch point is within a predetermined distance ahead of the vehicle, the guidance prompt for the guide branch point ahead is set, but the timing at which the guidance prompt is set for the guide branch point may be another timing. For example, a guidance prompt may be set for each guide branch point in the guide route at the time that the guide route is set. Also, a guidance prompt may be set for each guide branch point before the guide route is set.

Also, the numerical values (such as 5 meters, 50 meters, and 100 meters) used in each of the first guidance prompt determining process (FIG. 7), the second guidance prompt determining process (FIG. 8), and the third guidance prompt determining process (FIG. 9) may be changed as appropriate. For example, they may be changed according to the type of vehicle.

Also, in the example embodiment, the information related to all of the traffic lights near the branch points is stored as the traffic light information 36, but only information related to the traffic light on the far exit side for each direction in which a vehicle exits a branch point may be stored. In this case, the invention may also be carried out by replacing the entrance side traffic lights in the example embodiment with the exit side traffic lights. Moreover, only information related to the traffic light on the far entrance side for each direction in which a vehicle enters a branch point may be stored. Also, information related to stop lines instead of traffic lights may be stored. In this case, the invention may also be carried out by replacing the entrance side traffic lights and exit side traffic lights in the example embodiment with stop lines. Even if stop lines are used instead of traffic lights, guidance is preferably performed using traffic lights and branch points.

Also, in the example embodiment, when there are a plurality of potential guidance prompts that are determined to be suitable as guidance prompts for guiding the vehicle through a branch point ahead of the vehicle, a potential guidance prompt in which guidance will be started at an early timing is preferentially set as the guidance prompt for the guide branch point. Alternatively, however, the preference order of the potential guidance prompts may be set based on other criteria.

Also, in the example embodiment, in the third guidance prompt determining process (FIG. 11), if the condition that guidance be finished by 5 meters before the exit side traffic light of the first branch point is not satisfied, the potential guidance prompt "turn left (right) at the next light after the light being driven through" is recognized as being unsuitable as a guidance prompt for performing guidance for the guide branch point ahead of the vehicle (step S60), but the potential guidance prompt "turn left (right) at the next light after the light being driven through" may be recognized as being suitable as a guidance prompt for performing guidance for the guide branch point ahead of the vehicle when the condition that guidance be finished by 5 meters before the exit side traffic light of the first branch point is satisfied as a result of correcting the guidance starting point. In this case, the timing at which the vehicle reaches the corrected guidance starting point is newly set as the guidance start timing.

Also, the invention may be applied not only to a navigation system, but also to a system with a function that performs route guidance based on a guide route. For example, the invention may also be applied to a mobile terminal such as a mobile phone or a PDA, a personal computer, or a mobile music player or the like (hereinafter referred to as a "mobile terminal or the like"). The invention may also be applied to a system formed by a server and a mobile terminal or the like. In this case, the steps in the branch point guidance processing program (FIGS. 5 to 7, 9, and 11) described above may be executed by either the server or the mobile terminal or the like. Also, if the invention is applied to a mobile terminal or the like, travel guidance may also be performed for a movable object other than a vehicle, such as a bicycle or a user of the mobile terminal, for example.

The invention claimed is:

1. A travel guidance system comprising:
   a memory that stores:
      guidance prompts; and
      a travel guidance program; and
   a processor configured by the stored guidance program to:
      set a guide route along which a movable object is guided;
      set a guide branch point on the guide route;
      obtain a position of a first branch point that is closer to a point of departure of the guide route than the guide branch point;
      obtain a position of a second branch point that is closer to the point of departure than the first branch point;
      access the memory and select from the stored guidance prompts a plurality of potential guidance prompts that provide guidance along the guide route for the guide branch point;
      select one of the plurality of potential guidance prompts as a guidance prompt for the guide branch point by:
         setting, for each of the plurality of potential guidance prompts, a guidance starting point that is a point where spoken guidance starts and a guidance ending point that is a point by which the spoken guidance is required to be finished, the guidance starting point being defined by a position between the first branch point and the second branch point, based on one of the first branch point and the second branch point, and the guidance ending point being defined by a position based on one of the first branch point and the guide branch point;
         determining, for each of the plurality of potential guidance prompts, a guidance distance, which is a distance from the set guidance starting point for the potential guidance prompt to the guidance ending point for the potential guidance prompt;
         determining, for each of the plurality of potential guidance prompts, whether its determined guidance distance is greater than a speaking travel distance, which is a distance traveled by the movable object while performing spoken guidance using the potential guidance prompt; and
         selecting, as the predetermined guidance prompt, one of the potential guidance prompts for which it is determined that the guidance distance is greater than the speaking travel distance; and
      perform guidance for the guide branch point by outputting the spoken guidance for the selected predetermined guidance prompt on a speaker.

2. The travel guidance system according to claim 1, wherein the processor is configured by the stored guidance program to preferentially select, as the predetermined guidance prompt, the potential guidance prompt in which the guidance starting point is closer to the point of departure, when there are a plurality of potential guidance prompts for which it is determined that the guidance distance is greater than the speaking travel distance.

3. The travel guidance system according to claim 1, wherein, in the plurality of potential guidance prompts, the first branch point is used for performing the guidance for the guide branch point and phrases referring to the first branch point differ from one another.

4. The travel guidance system according to claim 1, wherein the processor is configured by the stored guidance program to set, as the guidance starting point, a point located a predetermined distance away from the one of the first branch point and the second branch point, for each of the plurality of potential guidance prompts.

5. The travel guidance system according to claim 1, wherein the processor is configured by the stored guidance program to:
   set a point as the guidance ending point that is closer to the guide branch point than the first branch point, for at least one of the potential guidance prompts, from among the plurality of potential guidance prompts, and
   set a point as the guidance ending point that is closer to the point of departure than the first branch point, for another potential guidance prompt other than the at least one potential guidance prompt, from among the plurality of potential guidance prompts.

6. The travel guidance system according to claim 1, wherein the processor is configured by the stored a guidance program to:
   set a continued guidance required point between the guidance starting point and the guidance ending point, for a specific potential guidance prompt, from among the plurality of potential guidance prompts;
   determine whether the guidance distance is greater than the speaking travel distance, and a distance from the guidance starting point to the continued guidance required point is less than the speaking travel distance; and
   select the specific potential guidance prompt as the predetermined guidance prompt when it is determined that the guidance distance is greater than the speaking travel distance, and the distance from the guidance starting point to the continued guidance required point is less than the speaking travel distance.

7. The travel guidance system according to claim 1, wherein the processor is configured by the stored guidance program to obtain position information of traffic lights along the guide route, wherein the position of the first branch point is defined by a position of a first traffic light near the first branch point;

the position of the second branch point is defined by a position of a second traffic light near the second branch point; and the position of the guide branch point is defined by a position of a third traffic light near the guide branch point.

8. The travel guidance system according to claim 7, wherein the plurality of the potential guidance prompts identify at least one of the first branch point, the second branch point, and the guide branch point by respectively using at least one of the first traffic light, the second traffic light, and the third traffic light.

9. A travel guidance method comprising:

setting, with a processor, a guide route along which a movable object is guided;

setting, with the processor, a guide branch point on the guide route;

obtaining, with the processor, a position of a first branch point that is closer to a point of departure of the guide route than the guide branch point;

obtaining, with the processor, a position of a second branch point that is closer to the point of departure than the first branch point;

accessing, with the processor, a memory that stores guidance prompts and selecting from the stored guidance prompts a plurality of potential guidance prompts that provide guidance along the guide route for the guide branch point;

selecting, with the processor, one of the plurality of potential guidance prompts as a guidance prompt for the guide branch point by:

setting, for each of the plurality of potential guidance prompts, a guidance starting point that is a point where spoken guidance starts and a guidance ending point that is a point by which the spoken guidance is required to be finished, the guidance starting point being defined by a position between the first branch point and the second branch point, based on one of the first branch point and the second branch point, and the guidance ending point being defined by a position based on one of the first branch point and the guide branch point;

determining, for each of the plurality of potential guidance prompts, a guidance distance, which is a distance from the set guidance starting point for the potential guidance prompt to the guidance ending point for the potential guidance prompt;

determining, for each of the plurality of potential guidance prompts, whether its determined guidance distance is greater than a speaking travel distance, which is a distance traveled by the movable object while performing spoken guidance using the potential guidance prompt; and selecting, as the predetermined guidance prompt, one of the potential guidance prompts for which it is determined that the guidance distance is greater than the speaking travel distance; and performing, with the processor, guidance for the guide branch point by outputting the spoken guidance for the selected predetermined guidance prompt on a speaker.

10. A non-transitory, computer-readable storage medium storing a computer-executable program for performing a travel guidance function, the program comprising instructions for:

setting a guide route along which a movable object is guided;

setting a guide branch point on the guide route;

obtaining a position of a first branch point that is closer to a point of departure of the guide route than the guide branch point;

obtaining a position of a second branch point that is closer to the point of departure than the first branch point;

accessing a memory that stores guidance prompts and selecting from the stored guidance prompts a plurality of potential guidance prompts that provide guidance along the guide route for the guide branch point;

selecting one of the plurality of potential guidance prompts as a guidance prompt for the guide branch point by:

setting, for each of the plurality of potential guidance prompts, a guidance starting point that is a point where spoken guidance starts and a guidance ending point that is a point by which the spoken guidance is required to be finished, the guidance starting point being defined by a position between the first branch point and the second branch point, based on one of the first branch point and the second branch point, and the guidance ending point being defined by a position based on one of the first branch point and the guide branch point;

determining, for each of the plurality of potential guidance prompts, a guidance distance, which is a distance from the set guidance starting point for the potential guidance prompt to the guidance ending point for the potential guidance prompt;

determining, for each of the plurality of potential guidance prompts, whether its determined guidance distance is greater than a speaking travel distance, which is a distance traveled by the movable object while performing spoken guidance using the potential guidance prompt; and selecting, as the predetermined guidance prompt, one of the potential guidance prompts for which it is determined that the guidance distance is greater than the speaking travel distance; and performing guidance for the guide branch point by outputting the spoken guidance for the selected predetermined guidance prompt on a speaker.

* * * * *